United States Patent
Gupta et al.

(10) Patent No.: US 7,953,805 B2
(45) Date of Patent: May 31, 2011

(54) METHODS FOR CREATING AND USING ELECTRONIC MAILING GROUPS

(75) Inventors: Deepak Gupta, Delhi (IN); Namita Gupta, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 11/688,316

(22) Filed: Mar. 20, 2007

(65) Prior Publication Data

US 2008/0235334 A1    Sep. 25, 2008

(51) Int. Cl.
*G06F 15/16* (2006.01)
(52) U.S. Cl. ......... 709/206; 709/203; 709/205; 715/752
(58) Field of Classification Search .............. 709/203, 709/205–206; 715/752
See application file for complete search history.

(56) References Cited

U.S. PATENT DOCUMENTS

| | | |
|---|---|---|
| 2001/0002469 A1 | 5/2001 | Bates et al. |
| 2002/0013817 A1 | 1/2002 | Collins et al. |
| 2002/0107930 A1 | 8/2002 | Itoh |
| 2003/0115271 A1 | 6/2003 | Weissman |
| 2006/0036699 A1 | 2/2006 | Bauchot et al. |
| 2006/0041625 A1 | 2/2006 | Chen et al. |
| 2008/0168360 A1* | 7/2008 | Wilson .......... 715/752 |

OTHER PUBLICATIONS

Ablebits; Outlook BCC/CC—blind carbon copy/copies with Outlook Auto BCC/CC; (on-line); 4 pages; (retrieved on Jul. 21, 2006); Retrieved from the internet:<URL: http://www.ablebits.com/outlook-blind-carbon-copy-bcc-email-addins/index.php>.

\* cited by examiner

*Primary Examiner* — Thu Ha T Nguyen
(74) *Attorney, Agent, or Firm* — Schmeiser, Olsen & Watts; John Pivnichny

(57) ABSTRACT

A method for creating an electronic mailing group. The method is implemented via execution of computer readable program code on a processor of a computer system. A first input is stored in a computer-readable storage medium. The first input includes a first group name for distributing a first electronic mail message. The first group name is associated with a plurality of electronic mail addresses, based on a first set of received instructions. The first group name represents the addresses. After associating, information associated with the first group name is stored in the storage medium. The information is associated with each address of the addresses and designates each address of the addresses as a first recipient type selected from: To recipient, Carbon Copy recipient, and Blind Carbon Copy recipient. At least one address of the addresses is designated as a Carbon Copy recipient or a Blind Carbon Copy recipient.

15 Claims, 14 Drawing Sheets

METHODS FOR CREATING AND USING ELECTRONIC MAILING GROUPS

FIELD OF THE INVENTION

The present invention relates to a method for addressing and sending electronic mail messages to a group name associated with multiple electronic mail addresses.

BACKGROUND OF THE INVENTION

Electronic mail (e-mail) messages may be transmitted using e-mail software, where a user may specify a recipient by placing an e-mail address of the recipient in any of three fields in the message. By placing the recipient's e-mail address in the "To" field, the user may specify that the recipient is the main recipient and a response or action may be required. Also, the user main specify a secondary recipient by placing that recipient's e-mail address in a "CC" field, where the secondary recipient receives a "carbon copy" or "courtesy copy" of the e-mail message but is not required necessarily to respond or act. This secondary or "carbon copy" recipient may be disclosed to other recipients of the e-mail message. In addition, a third type of recipient may be specified by placing the recipient's e-mail address in a "BCC" field, where the third recipient receives a "blind carbon copy" where the recipient receives a copy of the e-mail message but none of the other recipients are notified that this BCC recipient has received the e-mail message.

Electronic mail messages may be sent to multiple addressees by creating a mailing group. A mailing group may be a list of e-mail addresses which are associated with a single name, the mailing group name. A user may address an e-mail message to the group name to send the e-mail to all the e-mail addresses in the list. One disadvantage is that mailing groups do not specify if the names are to be To, CC, or BCC recipients. A user must manually place mailing group names into fields of e-mail messages to designate which addresses are to be To, CC, and BCC recipients. For very large lists of addressees and multiple mailing group names, this can be cumbersome and error prone. There exists a need for a method which overcomes at least one of the aforementioned difficulties with current practice involving mailing groups.

SUMMARY OF THE INVENTION

The present invention relates to a method for creating an electronic mailing group, said method being implemented via execution of computer readable program code on a processor of a computer system, said method comprising:

storing a first input in a computer-readable storage medium, wherein said first input comprises a first group name for distributing a first electronic mail message;

associating said first group name with a plurality of electronic mail addresses, based on a first set of received instructions, wherein said first group name represents said addresses; and after said associating, storing information associated with said first group name in said storage medium, wherein said information is associated with each address of said addresses and designates each address of said addresses as a first recipient type selected from the group consisting of To recipient, Carbon Copy recipient, and Blind Carbon Copy recipient, wherein at least one address of said addresses is designated as a Carbon Copy recipient or a Blind Carbon Copy recipient.

The present invention relates to a process for deploying computing infrastructure, said process comprising integrating computer-readable code into a computer system, wherein the code in combination with the computer system is capable of performing a method, said method comprising:

storing a first input in a computer-readable storage medium, wherein said first input comprises a first group name for distributing a first electronic mail message;

associating said first name with a plurality of electronic mail addresses, based on a first set of received instructions, wherein said first group name represents said addresses; and after said associating, storing information associated with said first group name in said storage medium, wherein said information is associated with each address of said addresses and designates each address of said addresses as a first recipient type selected from the group consisting of To recipient, Carbon Copy recipient, and Blind Carbon Copy recipient, wherein at least one address of said addresses is designated as a Carbon Copy recipient or a Blind Carbon Copy recipient.

The present invention relates to a method for sending an electronic mail message, said method being implemented via execution of computer readable program code on a processor of a computer system, said method comprising:

receiving a group name into a computer-readable storage medium, said group name representing a plurality of recipient electronic mail addresses associated with said group name, wherein each address of said addresses has a designation as a To recipient, a Carbon Copy recipient or a Blind Carbon Copy recipient, wherein at least one address of said addresses has a designation as a Carbon Copy recipient or a Blind Carbon Copy recipient;

receiving at least one instruction, into said storage medium, to send said message to said group name; and responsive to said receiving said at least one instruction, sending automatically said message to each address of said addresses, wherein said message is sent according to said designation for each address of said addresses, wherein each said To recipient is disclosed to all recipients of said message, wherein each said Carbon Copy recipient is disclosed to all recipients of said message, wherein each said Blind Carbon Copy recipient is not disclosed to any other recipients of said message.

The present invention relates to a process for deploying computing infrastructure, said process comprising integrating computer-readable code into a computer system, wherein the code in combination with the computer system is capable of performing a method, said method comprising:

receiving a group name into a computer-readable storage medium, said group name representing a plurality of recipient electronic mail addresses associated with said group name, wherein each address of said addresses has a designation as a To recipient, a Carbon Copy recipient or a Blind Carbon Copy recipient, wherein at least one address of said addresses has a designation as a Carbon Copy recipient or a Blind Carbon Copy recipient;

receiving at least one instruction, into said storage medium, to send said message to said group name; and responsive to said receiving said at least one instruction, sending automatically said message to each address of said addresses, wherein said message is sent according to said designation for each address of said addresses, wherein each said To recipient is disclosed to all recipients of said message, wherein each said Carbon Copy recipient is disclosed to all recipients of said message, wherein each said Blind Carbon Copy recipient is not disclosed to any other recipients of said message.

BRIEF DESCRIPTION OF THE DRAWINGS

The features of the invention are set forth in the appended claims. The invention itself, however, will be best understood by reference to the following detailed description of illustrative embodiments when read in conjunction with the accompanying drawings. The features and advantages of the present invention are illustrated in detail in the accompanying drawings, wherein like reference numerals refer to like elements throughout the drawings. Although the drawings are intended to illustrate the present invention, the drawings are not necessarily drawn to scale.

FIG. 6 is selected, in accordance with the embodiments of the present invention.

DETAILED DESCRIPTION OF THE INVENTION

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as examples of embodiments.

Figure 1:
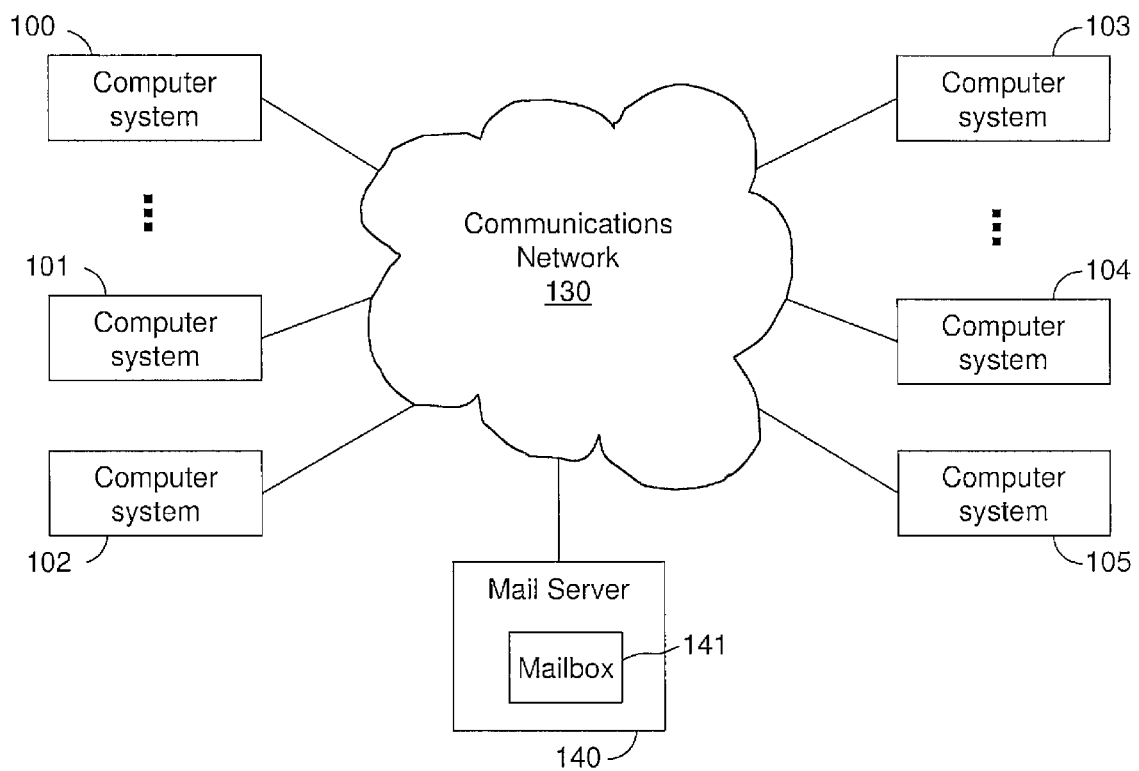
FIG. 1 is a block diagram of a communication environment for performing a method of sending electronic mail messages, in accordance with the embodiments of the present invention.

FIG. 1 is a block diagram of a communication environment for performing a method of sending electronic mail messages, in accordance with the embodiments of the present invention. Computer systems 100 to 105 may be, for example, communications terminals or information processors such as personal computers capable of communicating through a communications network 130 (such as the Internet, an intranet, etc.), or communication terminals such as mobile phones having an Internet connection hard disk, a floppy disk, a combination of these, etc. The output device may comprise a communication device, such as a phone modem, a wireless modem, a cable modem, a digital subscriber line (DSL) modem, an Ethernet connection with an network interface card (NIC), etc, or a combination of these which may connect to the communications network 130. The computer-readable storage media 94 and 95 may comprise, inter alia, memory devices such as a hard disk, a floppy disk, a magnetic tape, an optical storage such as a compact disc (CD) or a digital video disc (DVD), a dynamic random access memory (DRAM), a read-only memory (ROM), a flash memory data storage device such as a universal serial bus (USB) flash drive, etc. The computer-readable storage medium 95 may include a computer code 97 which is a computer program that comprises computer-executable instructions. The computer code 97 may include an algorithm for sending electronic mail messages (e.g., the algorithm of FIG. 7). The processor 91 may execute the computer code 97. The computer-readable storage medium 94 may include input data 96. The input data 96 may include input required by the computer code 97. The output device 93 may display output from the computer code 97. Either or both computer-readable storage media 94 and 95 (or one or more additional computer-readable storage media not shown in FIG. 2) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Thus the present invention discloses a process for deploying or integrating function. The communications network 130 may be an intranet such as a LAN (Local Area Network) in a limited area, such as within a corporation or a university, and may be accessed by a limited number of people. The communications network 130 may be an Internet available to an unspecified, large number of people through a public communication line. The computer systems 100 to 105 may be connected to the communications network 130.

The communications network 130 may be, for example, provided with a mail server 140 such as DOMINO of Lotus Development Corporation, and a mailbox 141 storing incoming electronic mail messages (incoming mail messages) may be provided in the mail server 140. The communications network 130 may include a mail server 140 of, for example, a private provider. The transmission and reception of e-mail in the communications network 130 may be managed by the mail server 140, and an address book may also be provided in the mail server 140, where the address book may be a public address book or may be limited to a private address book provided in a computer system on a sender side.

Figure 2:
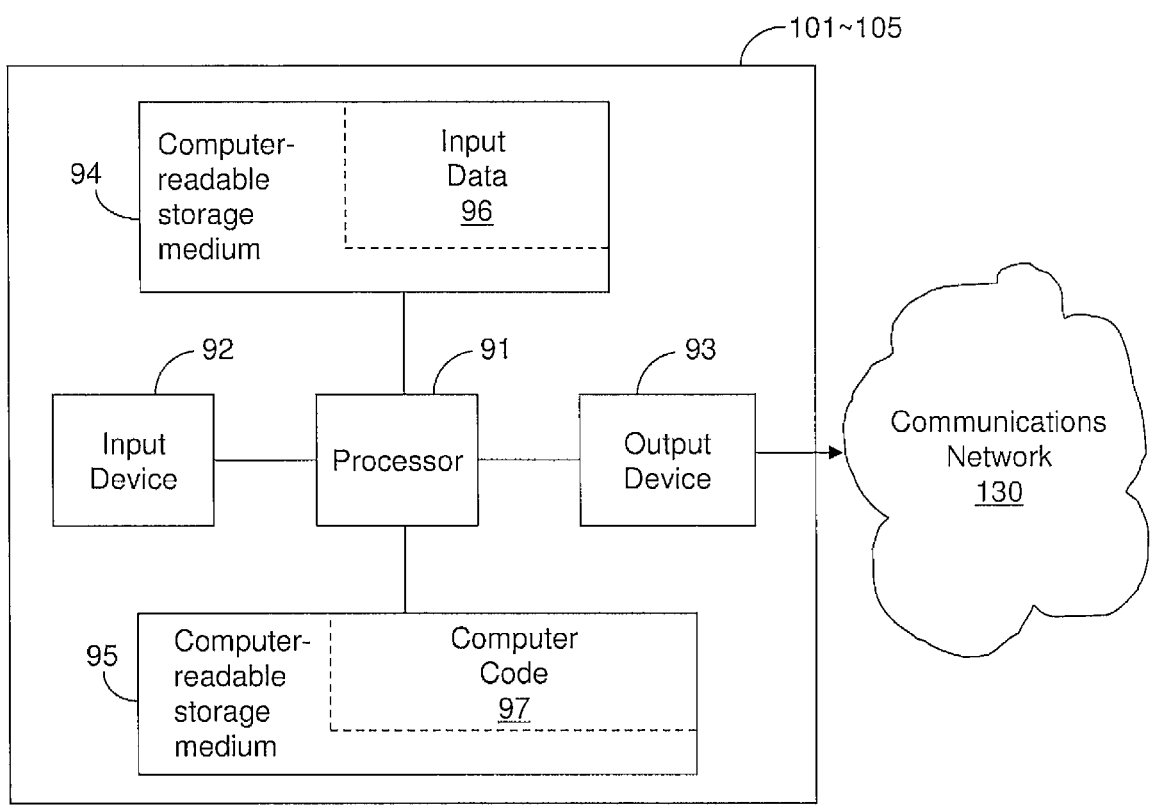
FIG. 2 illustrates an example of the computer systems in FIG. 1 used for sending electronic mail messages, in accordance with embodiments of the present invention.

FIG. 2 illustrates an example of the computer systems 100 to 105 in FIG. 1 used for sending e-mail messages, in accordance with embodiments of the present invention. Each of the computer systems comprises a processor 91, an input device 92 coupled to the processor 91, an output device 93 coupled to the processor 91, and computer-readable storage media 94 and 95 each coupled to the processor 91. The input device 92 may be, inter alia, a keyboard, a mouse, a microphone, a touch sensitive computer screen, a joystick, a combination of these, etc. The output device 93 may comprise, inter alia, a printer, a plotter, a computer display screen or monitor, a magnetic tape, a removable computing infrastructure, comprising integrating computer-readable code into any of the computer systems 100 to 105, wherein the code in combination with any of the computer systems 100 to 105 is capable of performing a method for sending an electronic mail message.

While FIG. 2 shows an example of one of the computer systems 100 to 105 as a particular configuration of hardware and software, any configuration of hardware and software, as would be known to a person of ordinary skill in the art, may be utilized for the purposes stated supra in conjunction with the particular computer systems 100 to 105 of FIG. 2. For example, the computer-readable storage media 94 and 95 may be portions of a single computer-readable storage medium rather than separate media.

Figure 3:
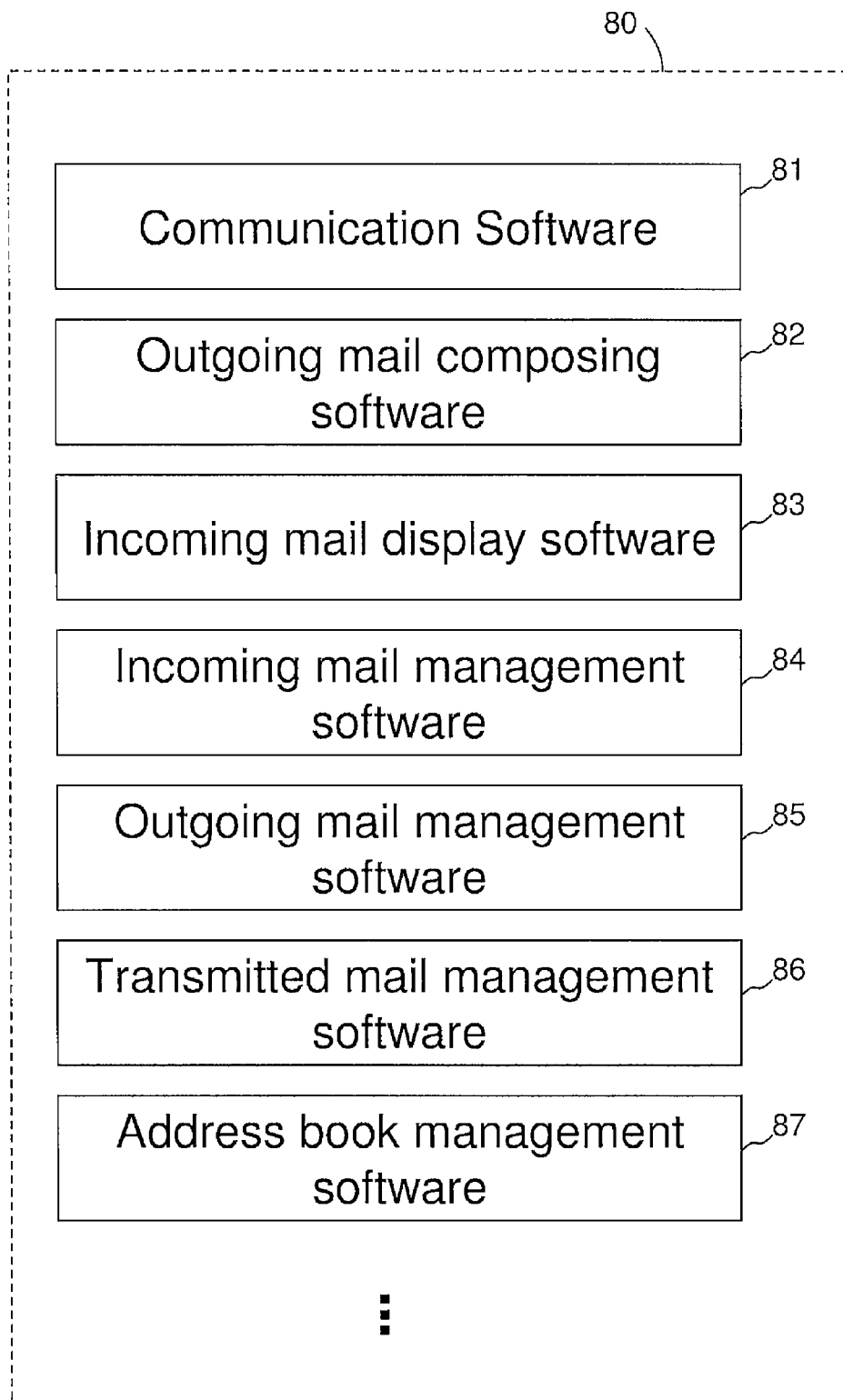
FIG. 3 is a block diagram of an example of electronic mail software stored in the computer-readable storage medium in the computer systems in FIG. 1, in accordance with embodiments of the present invention.

FIG. 3 is a block diagram of an example of electronic mail software stored in the computer-readable storage medium 95 in the computer systems 100 to 105. The electronic mail software 80 may comprise communication software 81 for communication with the communications network 130 (see FIG. 1), outgoing mail composing software 82 for composing an outgoing electronic mail message, incoming mail display software 83 used to display a received electronic mail message at the display device 93 shown in FIG. 2, incoming mail management software 84 for storing incoming electronic mail messages at, for example, an inbox address or a cabinet address in the computer-readable storage media 94 and 95, outgoing mail management software 85 for storing an outgoing electronic mail message at, for example, an outbox address or a cabinet address in the computer-readable storage media 94 and 95, transmitted mail management software 86 for storing transmitted electronic mail messages at, for example, a transmitted file address or a cabinet address, and address book management software 87 for managing registration in, change to, and deletion from a personal address book.

Figure 4A:
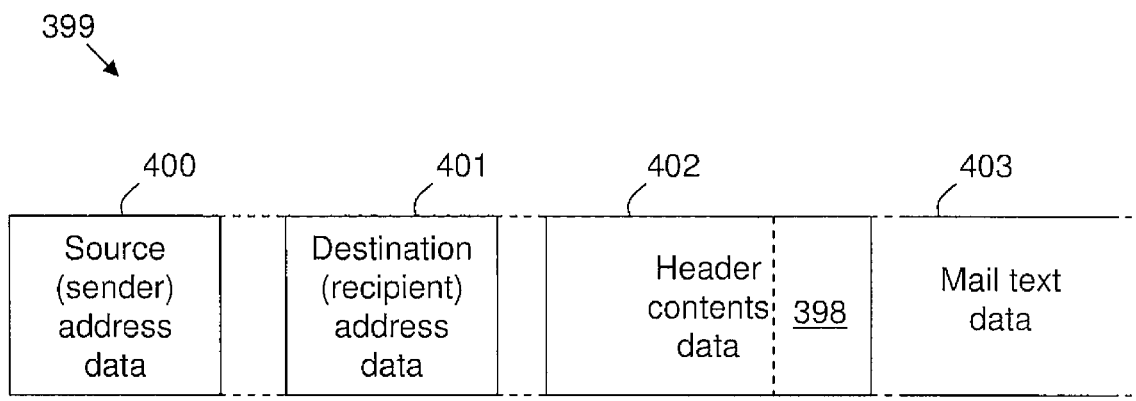
FIG. 4A is a diagram showing an example of the general data structure of an electronic mail message to be transmitted from a computer system, in accordance with embodiments of the present invention.

FIG. 4A is a diagram showing an example of a general data structure 399 of an electronic mail message which is stored in a computer-readable storage medium (e.g. 94 and/or 95 in FIG. 2) to be transmitted from a computer system 100-105. The data structure 399 comprises source (sender) address data 400 of a sender which may be used for reply mail, destination address data 401 of a recipient referred to by the mail server (140 of FIG. 1) in determining where to forward the electronic mail message, header contents data 402 of the outgoing electronic mail message, and mail text data 403 of the outgoing electronic mail message. The header contents data 402 may contain data indicated at the header of the electronic mail message. The header contents data may contain portion 398.

Figure 4B:
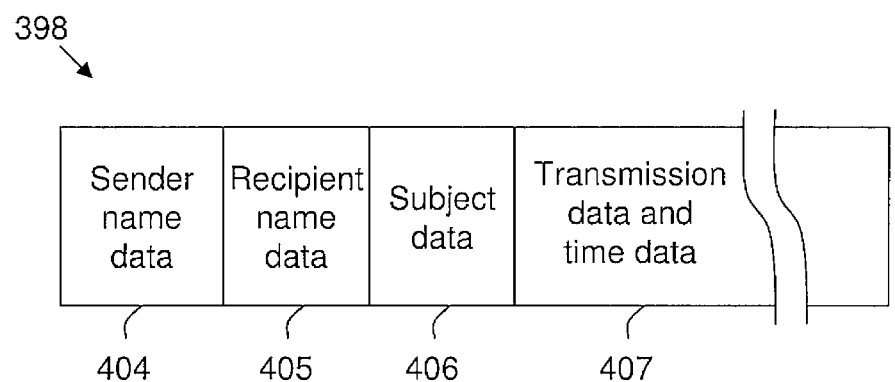
FIG. 4B is a detailed view of portion 398 of the header contents data of FIG. 4A, in accordance with embodiments of the present invention.

FIG. 4B is a detailed view of portion 398 of the header contents data 402 of FIG. 4A comprising sender name data 404, recipient name data 405, subject data 406 relating to the title or subject of the electronic mail message, and transmission data and time data 407 related to the date and time of transmission. Other header data of an electronic mail message such as data in a CC (Carbon Copy) section or recipient data in a BCC (Blind Carbon Copy) section may be included, and processing of such data may be similar to that of the recipient name data 405.

For example, if the destination of an outgoing electronic mail message is a group name, and the electronic mail message is transmitted to all the members of the group, the group name may be stored as the recipient name data 405, and individual address data selected from all the group members may be sequentially stored as the destination (recipient) address data (401 of FIG. 4A) for each transmission and, thus, the electronic mail message may be distributed to all the members.

The mail server 140 may determine the forwarding address of an electronic mail message based on the destination (recipient) address data (401 of FIG. 4A) and, therefore, may distribute the transmitted electronic mail message to the mailbox at the mail address of each group member even if the group name is stored as the recipient name data (405 of FIG. 4A). The group name of the recipient name data 405 may be indicated only at the header on a display screen for the incoming electronic mail message, and may not necessarily be used by the mail server 140.

Figure 5:
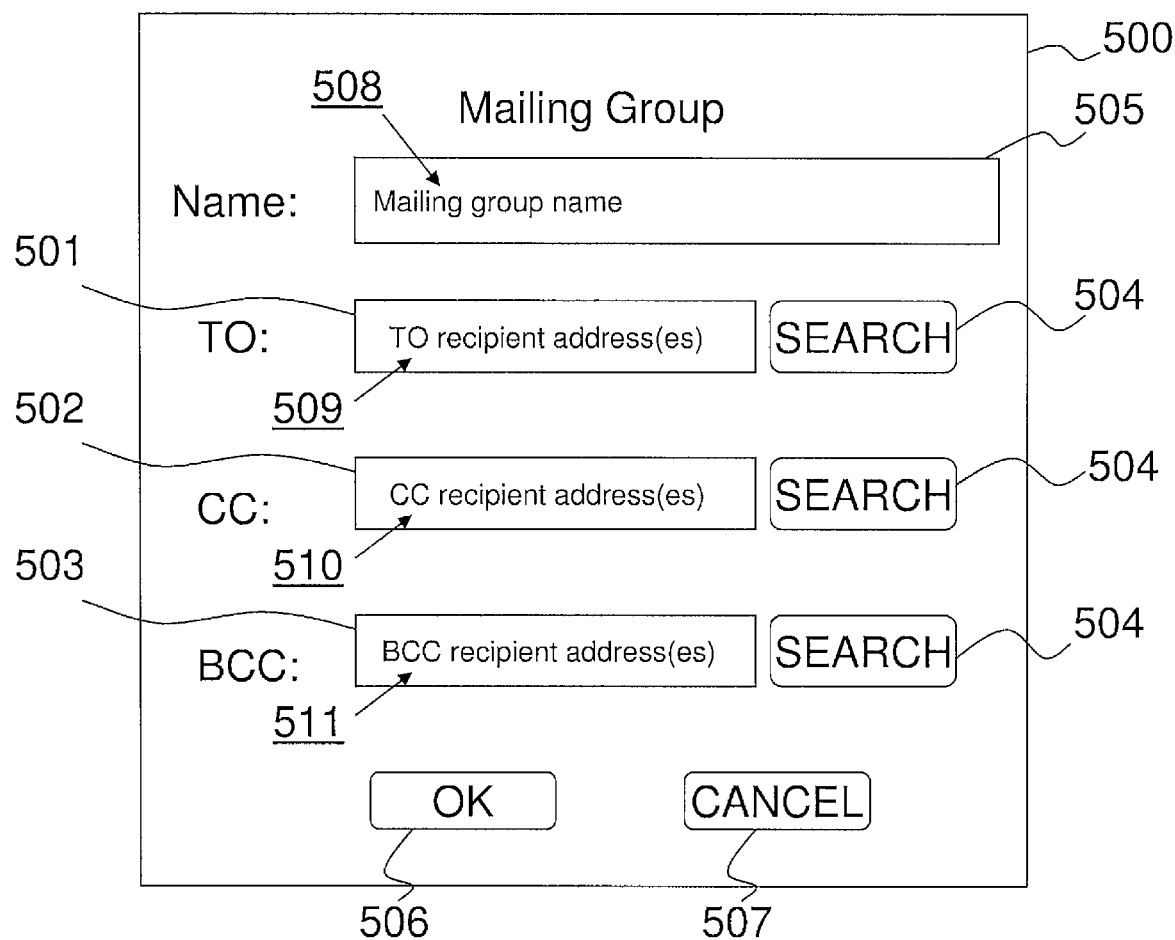
FIG. 5 illustrates an example of a computer program window which may be presented to a user on an output device of FIG. 2 for creating an electronic mailing group, in accordance with the embodiments of the present invention.

FIG. 5 illustrates an example of a computer program window 500 which may be presented to a user on an output device 93 (such as a computer display screen for example) of any of the computers 100 to 105 (see FIG. 1) by the electronic mail software 80 for creating an electronic mailing group for distributing an electronic mail message, in accordance with the embodiments of the present invention. Selections of buttons and entries into fields may be made using input devices 92 (see FIG. 2) in the computer systems 100 to 105. The mailing group name 508 may be entered by a user into an entry field 505. Recipients' addresses may be entered by a user into fields 501, 502, and 503, where recipient addresses may be individual e-mail addresses, a "nickname" representing an e-mail address, a mailing group name representing at least one address, or combinations of these.

A To recipient is defined as a recipient address or intended recipient address of an electronic mail message, where the To recipient is the primary audience of the message, and where the To recipient is disclosed to all the recipients of the electronic mail message. A Carbon Copy recipient is defined as a recipient address or intended recipient address of an electronic mail message, where the Carbon Copy recipient is to be notified of the message by receipt of the message, and where the Carbon Copy recipient is disclosed to all the recipients of the electronic mail message. A Blind Carbon Copy recipient is defined as a recipient address or intended recipient address of an electronic mail message, where the Blind Carbon Copy recipient is notified of the message by receipt of the message, and where the Blind Carbon Copy recipient is not disclosed to any other recipients of the electronic mail message.

Fields 501 to 503 may be used to enter recipient addresses. TO field 501 may be used to enter addresses of To recipients 509 who may be the primary audience of a message sent to the mailing group name. CC field 502 may be used to enter addresses of Carbon Copy recipients 510 whom the sender of the e-mail may wish to notify of the message. The addresses 509 and 510 entered in the TO field 501 and the CC field 502, respectively, may be disclosed to all recipients of an e-mail sent to the mailing group name. The BCC field 503 may be used to enter addresses of Blind Carbon Copy recipients 511 whom the sender may wish to covertly notify of an e-mail message sent to the mailing group name, where the addresses of the Blind Carbon Copy recipients 511 may not be disclosed to any of the other recipients.

Search buttons 504 may be used by a user to direct the electronic mail software 80 to search a database, hard drive, memory, communications network 130 (see FIG. 1), or other storage media to which the software 80 may have access, for a preexisting e-mail address of a potential recipient. Such an e-mail address may be stored in an electronic address book which may be stored and/or accessed by the electronic mail software program 80 (see FIG. 3), for example.

A user may select the OK button 506 which may provide instructions to the electronic mail software to save the mailing group name and e-mail addresses to the computer-readable storage media 94 and/or 95, where the computer code 97 may execute an algorithm to associate the e-mail addresses 509 to 511 with the mailing group name such that the mailing group name entered in field 505 represents the e-mail addresses 509 to 511 entered in fields 501, 502, and 503. By selecting the OK button 506, the user may provide instructions to the software 80 to designate each e-mail address as a To recipient, Carbon Copy recipient, or a Blind Carbon Copy recipient based on the field into which each e-mail address was entered. A user may select CANCEL button 507 to close the window 500 without saving any of the entered information to the storage medium.

The mailing group described above may be useful to a sender who wishes to send multiple e-mail messages to a group of recipients, where at least one of the recipients is a Carbon Copy recipient or a Blind Carbon Copy recipient. The mailing group described above allows the user to send the message to the group, without having to specify each time the designations for each recipient, since the designations for each type of recipient (To, Carbon Copy, and Blind Carbon Copy) are created when the mailing group is saved or created.

For example, a Project Lead sending e-mails to the entire team may always wish to send a carbon copy e-mail the Architect and the Project Manager. The Project Lead may create a mailing group name (for example) where each member of the entire team is a To recipient and the Architect and Project Managers are Carbon Copy recipients. Each email sent to the mailing group name created would automatically send a carbon copy email to the Architect and Project Manager as designated in the mailing group data in the storage media 94 and/or 95.

Another example may include e-mail messages where the mailing group name is associated with a very large list of recipient addresses, such as when a large corporation is merging with another where the number of recipients in the list may be in the hundreds, for example. During the merger process, both organizations may need to work in tandem, where large teams from each may be participating. For example a person from Organization A would like to send e-mail messages to the entire team of Organization B and at the same time send a carbon copy e-mail message to the team members of Organization A. The person may create a mailing group where the e-mail addresses of Organization A are designated as Carbon Copy recipients and the e-mail addresses of the team at Organization B are designated as To recipients. In this way, the person may send e-mail messages to the mailing group name and each recipient automatically receives the appropriate e-mail message according to their designation, without requiring the person to manually specify which recipient is a Carbon Copy recipient (such as by placing e-mail addresses into a field in a message composition screen, for example) each time the message is addressed.

Figure 6:
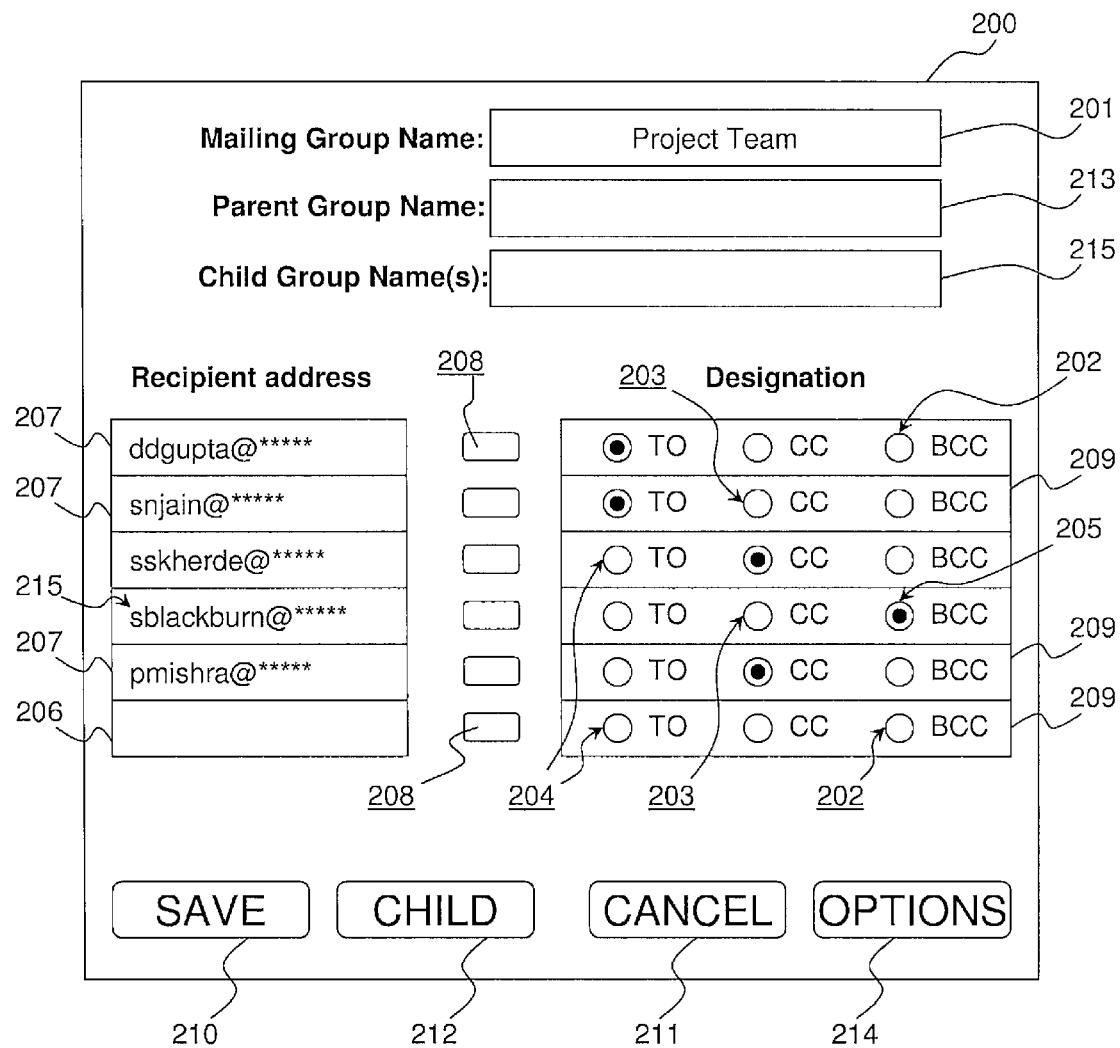
FIG. 6 illustrates an example of a computer display window which may be presented to a user on an output device of FIG. 2 for editing an existing electronic mailing group, in accordance with the embodiments of the present invention.

FIG. 6 illustrates an example of a computer display window 200 which may be presented to a user on an output device 93 (such as a computer display screen for example) of any of the computers 100 to 105 by the electronic mail software 80 for editing an existing electronic mailing group in accordance with the embodiments of the present invention. The window 200 may comprise a mailing group field 201 which may display the mailing group name, which in the FIG. 6 example is "Project Team". Recipients which are associated with the group name may be displayed in name fields 207. Empty fields 206 may be presented to the user for entering new e-mail addresses of recipients to be associated with the group name. Search buttons 208 may be presented to the user and used to direct the electronic mail software 80 to search a database, hard drive, memory, communications network 130 (see FIG. 1), or other storage medium to which it may have access, for a preexisting e-mail address of a potential recipient, to either enter the new address into an empty recipient field 206 or to replace an existing recipient address in a previously filled field 207. An e-mail address may be stored in an electronic address book which may be stored and/or accessed by the electronic mail software program 80, for example.

Designation fields 209 may be presented to the user to display the current designation information which designates the type of recipient for each corresponding recipient address in the recipient fields 207. In this example, the recipient types are indicated using clickable buttons for To 204, CC 203, and BCC 202, which may be darkened when selected by a mouse click or other input device 92. For example, in the example of FIG. 6, the recipient sblackburn@ * * * * * is designated as a Blind Carbon Copy recipient indicated by a darkened BCC clickable button 205. A user may use a mouse click to select the CC clickable button 203 corresponding to sblackburn@ * * * * * to designate that recipient as a Carbon Copy recipient, for example.

A user may select the SAVE button 210 which may provide instructions to the electronic mail software to save the mailing group name and e-mail addresses to the computer-readable storage media 94 and/or 95, where the computer code 97 may execute an algorithm to associate the e-mail addresses in recipient fields 207 with the mailing group name such that the mailing group name in field 201 represents the e-mail addresses in the recipient fields 207. By selecting the SAVE button 210, the user may provide instructions to the software to designate each e-mail address as a To recipient, Carbon Copy recipient, or a Blind Carbon Copy recipient based on the clickable button which was selected in the designation fields 209. A user may select a CANCEL button 211 to close the window 100 without saving any of the entered information to the storage medium.

The ability to edit and "shuffle" the recipient addresses and designations as described above may be useful when, for example, organizational structures change or when the topic of the e-mail message is different. For example, a Project Lead may wish to send all architectural related e-mail messages to the Project Architecture Group, and carbon copy the Project Architect, the other members of the Project Team, and the Project Manager. Yet, for e-mail messages concerning Module1, the Project Lead may wish to send all email messages to the Project Module team members, and carbon copy the other Project Team members and the Project Manager. In both these cases, the e-mail messages may be sent to the same recipients, yet depending on the topic of the message, the Project Lead may change the recipient designations in the mailing group as needed to send the e-mail message appropriately.

In the example of FIG. 6, a user may select CHILD button 212 to save a new version (or "child" mailing group) of the original mailing (or "parent") group under a new name, which may be linked with the parent mailing group. The data associated with the parent and/or child mailing group stored in the storage media 94 and/or 95 may contain instructions to link the child mailing group with the parent mailing group such that changes to the parent's recipients (such as added or deleted addresses) may be automatically changed in the child mailing group. The child mailing group may have the exact same recipients as the parent, where the designation information for each recipient may be different. A feature may be included within the software to present an option to the user to either allow or disallow automatic changes to the child mailing group when changes are made to the parent mailing group recipient addresses. A feature may be included within the software that removes the link between the parent and the child mailing groups. A feature may be included to allow or disallow changes to the recipient addresses in the child mailing group. A feature may include automatically creating a child mailing group when a mailing group is created, where the program creates the child group with an automatically generated name which may be based on the parent mailing group name. The OPTIONS box 214 is shown as an example of a selection a user may be able to make to open a new window where a user may make selections regarding the features described above.

Parent and child mailing group relationships may be displayed to a user. In FIG. 6, the Parent Group Name field 213 is an example of how the parent mailing group name may be displayed to a user if the mailing group that is being edited in FIG. 6 is the child of another mailing group. The Child Group Name field 215 is an example of how the name(s) of child mailing group(s) may be displayed to a user if the mailing group being edited is the parent group of one or more child mailing groups.

A Child mailing group may be useful to a sender who wishes to change the designations of the recipient addresses and still retain the original mailing group. Such as in the example above, the Project Lead may create a mailing group name for recipients to the e-mail message based on their designations such as To, CC, or BCC.

Figure 7:
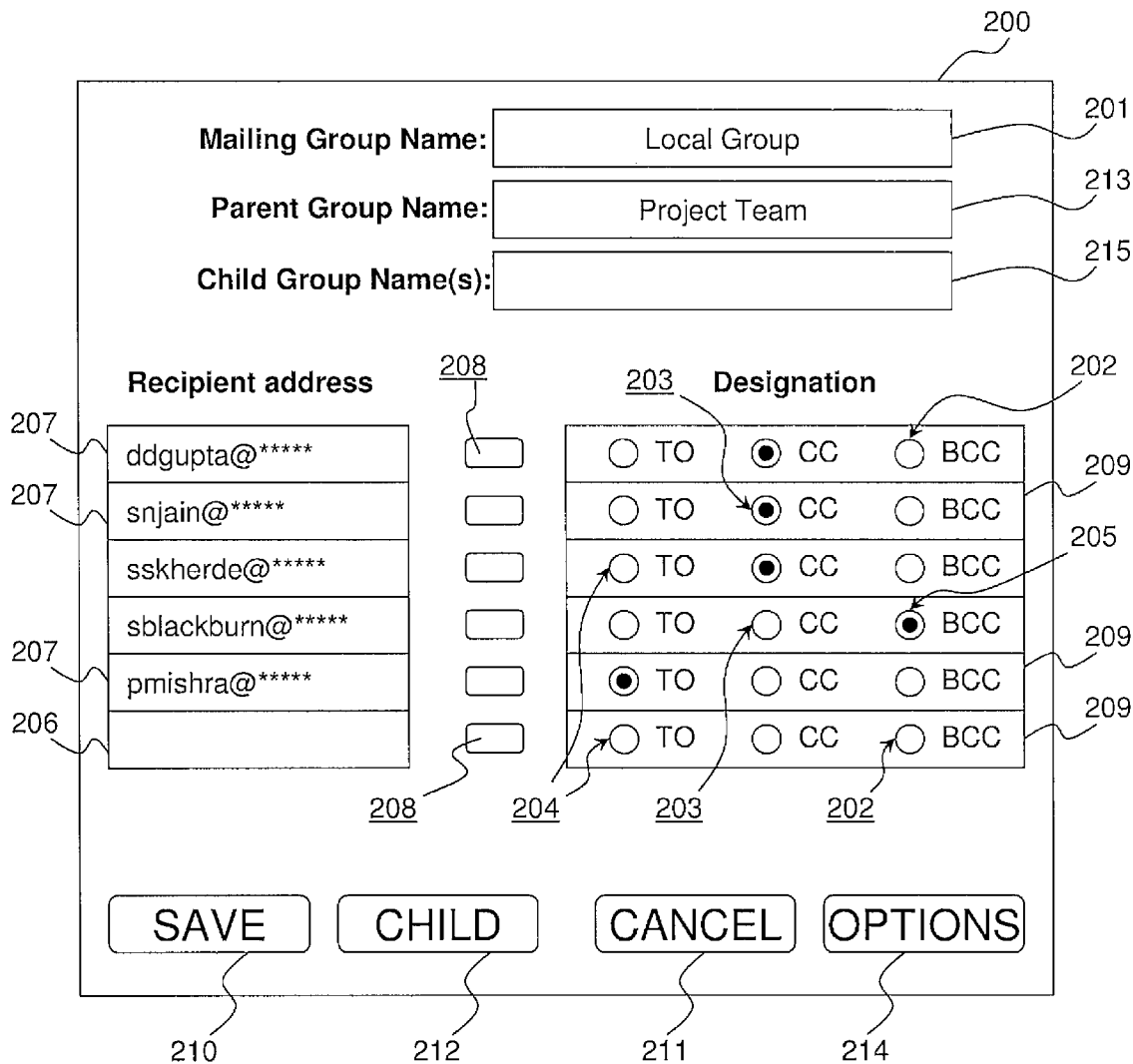
FIG. 7 illustrates an example of a computer display window which may be presented to a user on an output device of FIG. 2 when creating a child mailing group, in accordance with the embodiments of the present invention.

FIG. 7 illustrates an example of a computer display window 200 which may be presented to a user on an output device 93 (such as a computer display screen for example) of any of the computers 100 to 105 by the electronic mail software 80 for creating a child mailing group of the example electronic mailing group "Project Team" in FIG. 6, in accordance with the embodiments of the present invention. The name of the parent group ("Project Team") appears in the parent group field 213. As an example, a new name for the child mailing group, "Local Group" has been entered into the Mailing Group Name field 201. Recipient e-mail addresses in the child mailing group, Local Team, are identical to those of the parent mailing group, Project Team in FIG. 6. Designations for recipient e-mail addresses in the child mailing group may be changed as desired by the user. In the example illustrated in FIG. 7, the designations for recipient ddgupta@ * * * * * and snjain@ * * * * * have been changed to Carbon Copy, and the designation for pmishra@ * * * * * has been changed to To. Additional recipient addresses may be added to the child mailing group by entering a new address in an empty field 206, unless options within the program have been selected to prevent changing addresses from those found in the parent mailing group of the child.

Additional child mailing groups may be made from the present child mailing group by a user selecting the CHILD button 212. The new mailing group may be saved by a user selecting the SAVE button 210, or deleted by the user selecting the CANCEL button 214. Selecting the OPTIONS button 214 may provide the user with the same options as discussed above.

Figure 8:
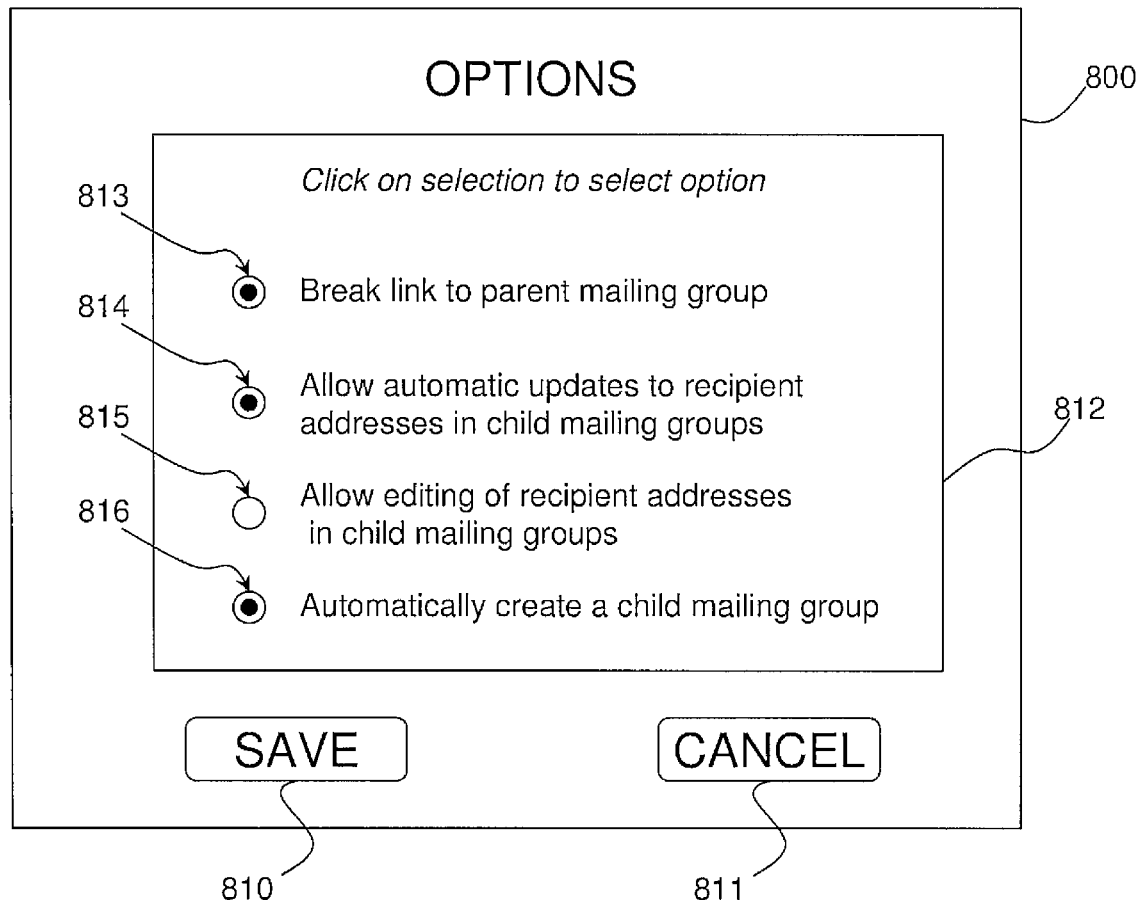
FIG. 8 illustrates an example of a computer display window which may be presented to a user on an output device of FIG. 2 when the OPTIONS button of FIG. 7

FIG. 8 illustrates an example of a computer display window 800 which may be Architectural related e-mail messages named "Architect Group", and then may create a Child group of the Architect Group named "Module 1" for e-mail messages sent containing Module 1 topics. The Project Lead may then select the appropriate mailing group name depending on the topic or content of the e-mail message being sent.

The software 80 may automatically create a mailing group or a Child mailing group of a parent group. The software 80 or computer code 97 may present a user an option to choose if they want to send an e-mail message in response to an internal memo, website, survey, invention disclosure form, a combination of these, and the like that the user has received electronically, where upon selecting such an option, the software 80 may automatically create a mailing group name to which e-mail addresses are associated. The e-mail addresses may be automatically selected by the software based on different factors depending on the origin of the option. For example, a user may be select an option to respond to an invention disclosure form sent for his/her review, whereupon the software 80 may generate a mailing group name associated with the e-mail addresses of the inventors listed in the form and an assigned patent attorney. In another example, a user may be commenting to an online survey and may be prompted to create a mailing group name where the name may be associated with the e-mail addresses of recipients who previously had requested to receive e-mail messages from commenters to initiate an e-mail based discussion, where some recipients may have requested to be Blind Carbon Copy recipients to any email sent to the group name. In another example, a mailing group name may be automatically generated when a user selects "reply to all" in response to a received e-mail message, where the software 80 automatically places the mailing group name in an address book and associates with the name the addresses of the presented to a user on an output device 93 (such as a computer display screen for example) of any of the computers 100 to 105 by the electronic mail software 80 when the OPTIONS button 214 of FIG. 7 or FIG. 6 is selected, in accordance with the embodiments of the present invention. The user may be presented with an options window 812 comprising selectable features 813 to 816 which may represent different treatments of mailing group information or data and associated email addresses by the electronic mail software 80.

In the example shown in FIG. 8, the selection box 813 for "Break link to parent mailing group" has been selected (as shown by the darkened selection box 813), which may direct the electronic mail software 80 to stop linking the current mailing group to its associated parent group. This action may stop, for example, updates to the child mailing group recipient addresses when recipient addresses are changed in the corresponding parent mailing group.

In the example shown in FIG. 8, the selection box 814 for "Allow automatic changes to recipient addresses in child groups" has been selected, which may direct the program to automatically change recipient addresses in linked child mailing groups when the changes are made to the recipient addresses in the parent group. This may be used by a user, for example, when there are several child groups and it becomes difficult to track each child group individually. A user selecting this option may change the recipients in the parent group (such as adding, deleting, or modifying, a recipient address), and the program may then be directed to automatically make the same changes in any child mailing group linked to that parent mailing group.

In the example shown in FIG. 8, the selection box 815 for "Allow changes to recipient addresses in child mailing groups" is not selected, which may direct the program, in this example, to prohibit a user from changing recipient addresses in the child mailing group other than by changing them in the parent and allowing the automatic changes (vide supra) to take place. If this feature is selected, a user may use this, for example, to add new e-mail recipients to a large existing child mailing group without having to create a separate new mailing group.

In the example shown in FIG. 8, the selection box 816 for "Automatically create a child mailing group" is selected, which may direct the program to automatically create a child mailing group linked to the parent mailing group, such as upon creation of the parent group. The program may automatically generate a name for the automatically created child mailing group based on the mailing group name of the parent such as by appending the name with a sequential number, for example. The program may also prompt the user to input a name for the new child mailing group upon its creation by the program. This feature may be useful to a user if several parent and child mailing groups are going to be created, where the user may direct the program to select this feature as a default option when creating mailing groups.

Figure 9:
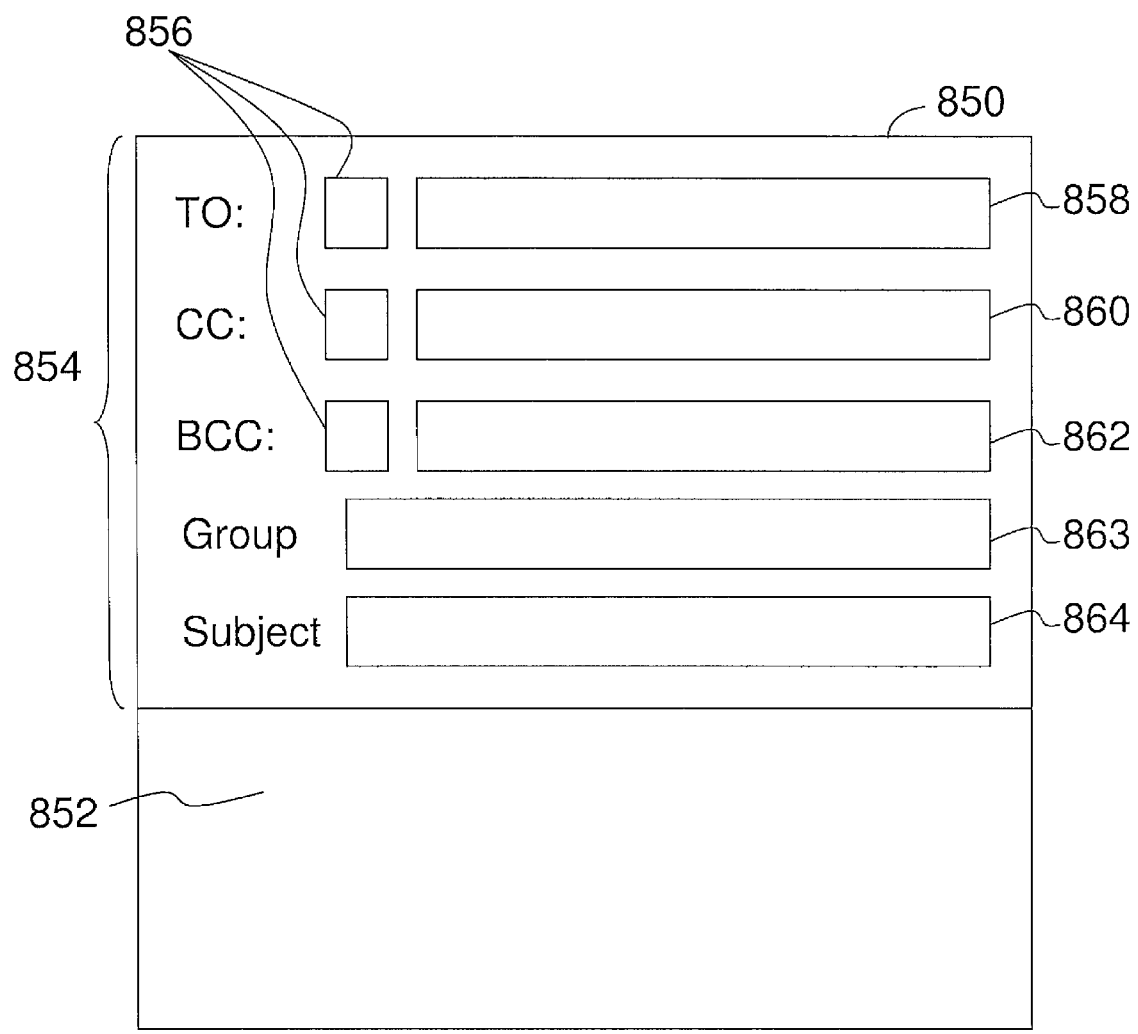
FIG. 9 illustrates an example of a screen or window for composing an outgoing electronic mail message, in accordance with embodiments of the present invention.

FIG. 9 illustrates an example of a screen or window for composing an outgoing electronic mail message, in accordance with embodiments of the present invention. An outgoing mail composing window 850 may comprise a header field 854 in which information necessary for transmission and reception of an electronic mail message may be input, and a mail text input field 852 in which a text of the electronic mail message may be input. The header field 854 may comprise a To recipient input field 858 in which a To recipient e-mail address or a mailing group name may be input, a Carbon Copy recipient input field 860 in which a Carbon Copy recipient e-mail address or a mailing group name to receive the message may be input, a Blind Carbon Copy recipient input field 862 in which a Blind Carbon Copy recipient e-mail address or a mailing group name to receive the message without being known to other recipients may be input, a subject input field 864 in which a title or subject of the electronic mail message may be input, a mailing group input field 863 where a mailing group name may be input as a recipient of the message, and address book reference or search buttons 857 for calling an address book allowing recipients (destinations) to be input in the To recipient input part 858, the Carbon Copy recipient input part 860, and the Blind Carbon Copy recipient input part 862, respectively, by simple selection processing.

A mailing group name may be input into any of the fields 858, 860, 862, or 863 of FIG. 9. The software 80 may disregard into which field the mailing group name is input and send the message according to the instructions to the software to designate each e-mail address associated with the mailing group name as a To recipient, Carbon Copy recipient, or a Blind Carbon Copy recipient based on, for example, the clickable button which was selected in the designation fields 209 of FIG. 6.

Figure 10:
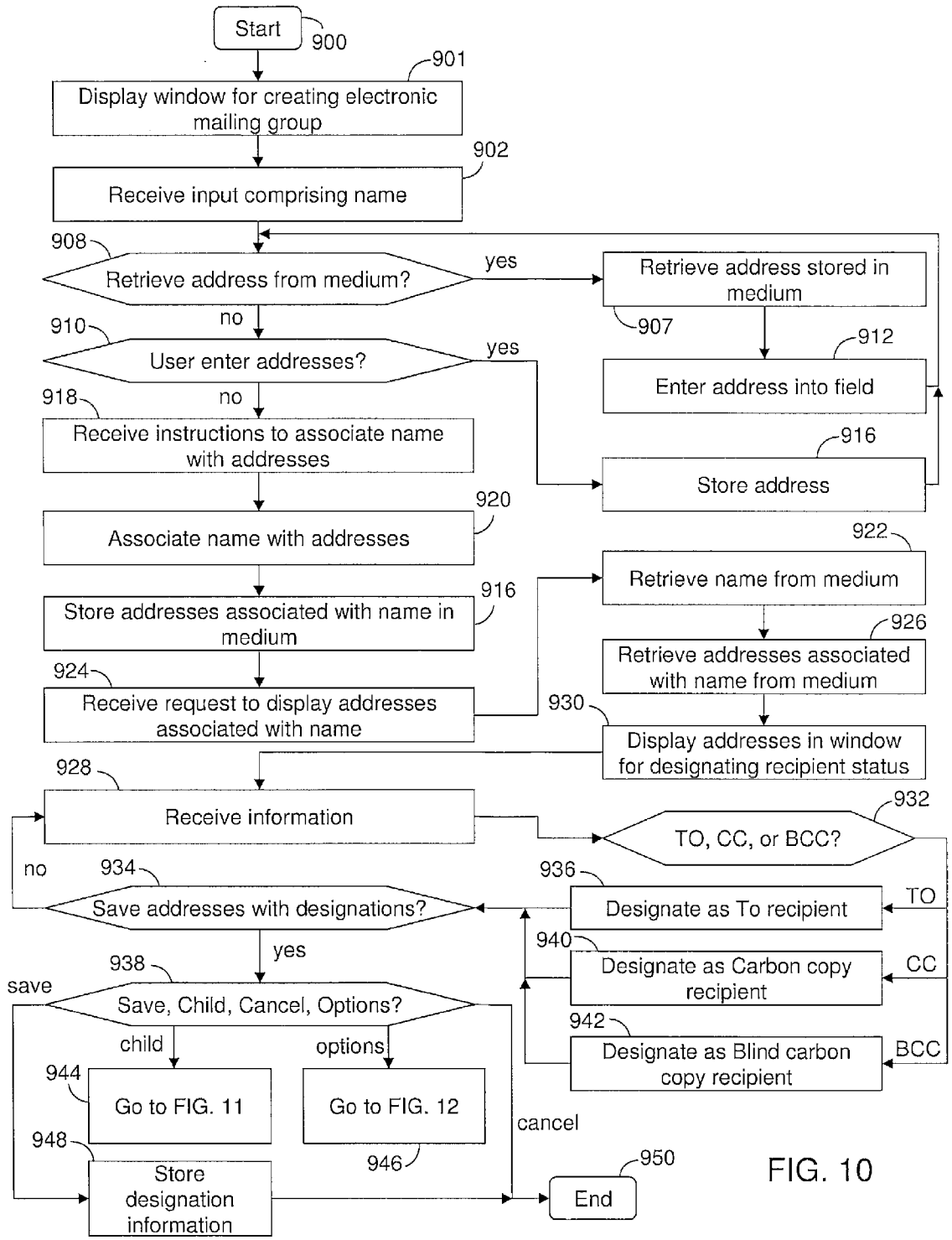
FIG. 10 is a flowchart illustrating a method for creating an electronic mailing group, in accordance with the embodiments of the present invention.

FIG. 10 is a flowchart illustrating a method by the electronic mail software 80 for creating an electronic mailing group in accordance with the embodiments of the present invention. In step 901, the software 80 of FIG. 3 displays a window 500 (see FIG. 5) for creating an electronic mailing group, where the computer system 100 of FIG. 1, for example, may use the software 80 of FIG. 3 to display the window 500. In step 902, the software receives an input comprising a mailing group name (such as 508 in FIG. 5), where the name 508 may be input by the user into name field 505 of FIG. 5 and received into and then stored in a storage medium (such as storage media 94 and/or 95 of FIG. 2).

In step 908 the software prompts a user to select from a list of e-mail addresses from the storage medium 94 and/or 95 by, for example, presenting the search button 504 of FIG. 5 to the user in window 500. If a user so selects the search button 504 associated with one of fields 501 to 503 in FIG. 5 (via a mouse click, hand-held pointer, cursor, etc.), the software 80 may perform step 907 by retrieving e-mail addresses stored in the storage media 94 and/or 95, followed by step 912 when the software 80 and enter user selected e-mail addresses into the appropriate fields. This may be presented to a user in several ways, such as presenting a list from which to select e-mail addresses, whereupon selecting an e-mail address directs the software 80 to enter the address into the field. After step 912, the software 80 returns to step 908. If a user does not select the search button presented in step 908, the software 80 continues to step 910.

In step 910, the software prompts a user to enter one or more recipient e-mail addresses manually (such as typing them into a field using an input device 92 such as a keyboard, for example). If a user enters addresses, the addresses are stored in the storage media 94 and/or 95 in step 916 by the software 80, and then software 80 returns to step 908. If a user does not enter addresses in step 910, the software continues to step 918.

In step 918, the software 80 receives a set of instructions (or a single instruction) to associate the addresses (such as those displayed in field 509 to 511 of FIG. 5), received in step 916 above, with the group name (such as 508 in FIG. 5) received as input in step 902. The instructions may be presented to the software 80 by the user selecting or clicking on the OK button 506 (in FIG. 5), for example. In step 920, the software 80 associates the group name with the recipient addresses upon receiving the instructions of step 918. Associating the mailing group name with the addresses may include storing data or the instructions received in step 918 with the name input in step 902, such that the name may represent the addresses with which the name is associated in step 920. In step 916, the software stores the addresses, associated group name, and any data or instructions which associate the name with the addresses, in the storage media 94 and/or 95. The software 80 may execute the storing of step 916 when the user selects the OK button 506 of FIG. 5, for example.

In step 924, the software 80 may receive at least one request from a user to display the addresses entered in steps 908 and/or 910, associated with the group name in step 920. Such a request may be made by a user by entering the group name into the input device 92 of FIG. 2 (such as a keyboard), for example. In step 922, the software 80 retrieves the group name input in step 902 from the storage media 94 and/or 95. In step 926, the software retrieves all the addresses associated with the group name in step 920. In step 930, the software 80 displays the addresses on an output device (such as 93 in FIG. 2), wherein the output device may be a screen and the addresses may be displayed in a window 200 (see FIG. 6) for example.

In step 928, in response to displaying the above information the software 80 receives information for each address, displayed in step 930, designating the recipient type. The information designates each recipient address as a To recipient, a Carbon Copy recipient, or a Blind Carbon Copy recipient. For example, a prompt may be presented to a user via selectable buttons 202 to 205 (see FIG. 6) in designation fields 209 of display window 200. In another example, a user may enter recipient addresses into a field which automatically designates the address as a To, Carbon Copy, and Blind Carbon Copy recipient such as fields 501 to 503 in FIG. 5.

In step 932, the software may determine, for each address, if the information received designates the address as a To recipient and proceed to step 936, a Carbon Copy recipient and proceed to step 940, or a Blind Carbon Copy recipient and proceed to step 942. In step 936, the software designates the address as a To recipient if the information received in step 928 makes such a designation. In step 940, the software designates the address as a Carbon Copy recipient if the information received in step 928 makes such a designation. In step 942, the software designates the address as a Blind Carbon Copy recipient if the information received in step 928 makes such a designation. In steps 936, 940, and 942, the software 80 associates the name received as input in step 902, with the designations for each address which the name is associated with in step 920. After determining the designation for each address based on the information, the software proceeds to step 934.

In step 934, the software 80 may prompt the user to store the addresses with the associated designations to the storage medium (for example, by displaying the save button 210 of FIG. 6, or the OK button if FIG. 5). The software 80 may write to the storage medium, appropriate information or data associated with each recipient address to store the designation of the address as a To, Carbon Copy, or Blind Carbon Copy recipient based on the designation information received in step 928. If the user selects save, the software 80 proceeds to step 938. If the user does not select SAVE, the software returns to step 928.

In response to receiving the information in step 928, the software may automatically retrieve additional recipients from the storage media 94 and/or 95 and associate the additional recipients with the mailing group name, based on preselected criteria. The software may automatically provide predetermined designation information for the additional recipients based on the designation information received in step 928 for the recipient addresses received in steps 908 and 910.

For example, referring to FIG. 6, the recipient address for sblackburn@ * * * * * may have been automatically added by the software 80 when the recipient address of ddgupta@ * * * * * was entered in the recipient address field 207. The software 80 may have included directions to automatically designate the recipient sblackburn@ * * * * * as a Blind Carbon Copy recipient (as indicated by the darkened selection button 205) whenever ddgupta@ * * * * * is included in a mailing group. Such a feature may be desirable, for example, to organizations where management requires covert notification of an employee's immediate supervisor of every message sent to the employee in a mailing group. In another example, such a feature may be desirable in the case of a merger between two corporations, where a message sent to the personnel department in one of the merging companies requires the automatic notification of the personnel department in the other company.

In the above examples, the software 80 may search through data stored within the storage media 94 and/or 95 and retrieve an address of the individual that corresponds to data identifying that individual as the supervisor. Such information may be readily available in, for example, a corporate email address book. Preselected criteria for selecting recipients which are automatically retrieved as described above, may include corporate organizational hierarchy, organizational location (such as country, county, city, state, province, etc.), department classification (such as engineering, marketing, sales, finance, etc.), age, gender, job classification (such as government job classification series, etc.), security clearance level (such as confidential, secret, top secret, etc.), employer (parent company, subsidiary, company being purchased by another, purchasing company, etc.), or a combination of these. Those skilled in the art will recognize that there may be additional equivalent criteria for selecting automatically retrieved recipients that are within the scope of the present invention.

In step 938, the software 80 may present the user with choices to save the information, create a child mailing group, cancel the entries, or edit options for the mailing group. An example of this may be by presenting in window 200 of FIG. 6 the selectable buttons save 210, child 212, cancel 211, and options 214. If a user selects save, the software proceeds to step 948 and stores (such as in the storage medium 94 and/or 95 of FIG. 2) the group name, recipient addresses, designation information, and data associated with the name, addresses, and designation information such that the name is associated with both the addresses and their corresponding designation information. If the user selects cancel the software 80 ends the process (950) without saving any entered information. If a user selects child, the software may proceed to step 944 where the software may follow the logic presented in FIG. 11. If a user selects option, the software proceeds to step 946 and proceeds to the logic illustrated in FIG. 12.

Figure 11:
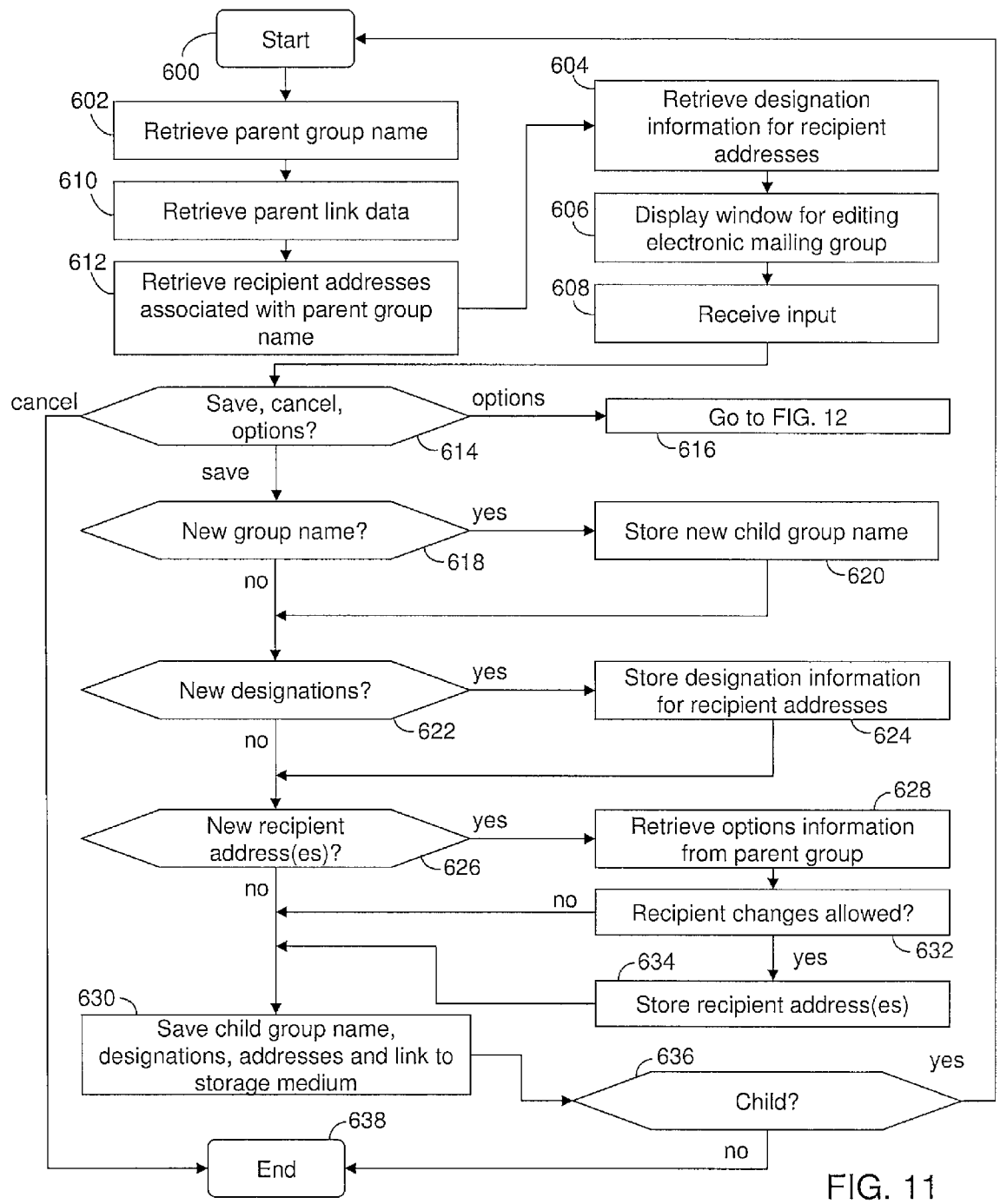
FIG. 11 is a flowchart illustrating a method for creating a child mailing group to an existing electronic mailing group, in accordance with the embodiments of the present invention.

FIG. 11 is a flowchart illustrating a method by the electronic mail software 80 for creating a child mailing group to an existing electronic mailing group, in accordance with the embodiments of the present invention, such as when a user directs the software 80 to create a child mailing group from an existing mailing group (such as in step 944 of FIG. 10). In step 602, the software 80 retrieves from the storage media 94 and/or 95 the parent mailing group name. In step 610, the software retrieves from the storage media 94 and/or 95 the link data associated with the parent mailing group name. In step 612 the software 80 retrieves from the storage media 94 and/or 95 the recipient addresses associated with the parent mailing group name. In step 604, the software 80 retrieves from the storage media 94 and/or 95 the designation information for each recipient address retrieved. In step 606 the software 80 displays in a window (such as window 200 of FIG. 7) the current mailing group name, the parent mailing group, the recipient addresses, and designations for each recipient address (see FIG. 7 as an example of how such information may be displayed). The current mailing group name may be a default name displayed by software 80, a new name input by a user, or a new name created by software 80 which may be an appended version of the parent group name.

In step 608, the software 80 receives input from a user, which may comprise information for recipient designation selections (such as in the designation fields 209 of FIG. 7), new recipient addresses (such as in fields 207 of FIG. 7), a new group name (such as in field 201 of FIG. 7), or a combination of these.

In step 614, the software may then receive directions to save, options, or cancel (such as by a user selecting the SAVE 210, OPTIONS 212, or CANCEL 211 buttons in FIG. 7). If the directions received are to go to options, the software 80 proceeds to step 616 and proceeds to the algorithm of FIG. 12. If the directions received are to cancel, the software 80 ends the program (638).

If the software 80 receives directions to save, the software 80 proceeds to step 618 and verifies if the input in step 608 comprises a new group name for the child group being created. If the input does comprise a new group name, the software stores the new name to the storage medium 94 and/or 95 in step 620, and then proceeds to step 622.

In step 622, the software verifies if the input in step 608 comprises new designation information for the recipient addresses, such as by comparing the designations input in step 608 with designation in formation retrieved in step 604. If the input does comprise new designation information, the software 80 stores the new designation information to the storage media 94 and 95 in step 624, and then proceeds to step 626.

In step 626, the software 80 verifies if the input in step 608 comprises any new recipient addresses (such as may be entered into empty recipient address fields such as field 206 in FIG. 7), or changes to addresses from the parent mailing group (such as those in recipient address fields 207 of FIG. 7), such as by comparing the addresses retrieved in step 612 with any input in step 608. If the input does comprise new or changed addresses, the software 80 proceeds to step 628 and retrieves options information associated with the parent mailing group name retrieved in step 602, and then proceeds to step 632 where the software verifies if recipient address changes are allowed to the recipient addresses of child groups of the parent group name retrieved in step 602 according to the options information retrieved in step 628. If changes are not allowed, the software does not store any of the changes and proceeds to step 630. If changes are allowed, the software 80 proceeds to step 634 and stores any changes and/or new recipient addresses in the storage media 94 and 95, and then proceeds to step 630.

In step 630, the software may then save the child mailing group to storage media 94 and 95 by storing all the input information in the storage media 94 and 95, which may comprise a new child group name, new and/or changes to designations for recipient e-mail addresses, and link information to the parent group, and then proceed to step 636.

In step 636, the software may receive an instruction (such as a mouse click of the clickable CHILD button 212 in FIG. 7) regarding whether or not to create a child mailing group of the child group just saved in step 630. If the software 80 receives an instruction to create another child group, the program returns to step 600. If the instruction is not received, the process ends (638).

Figure 12:
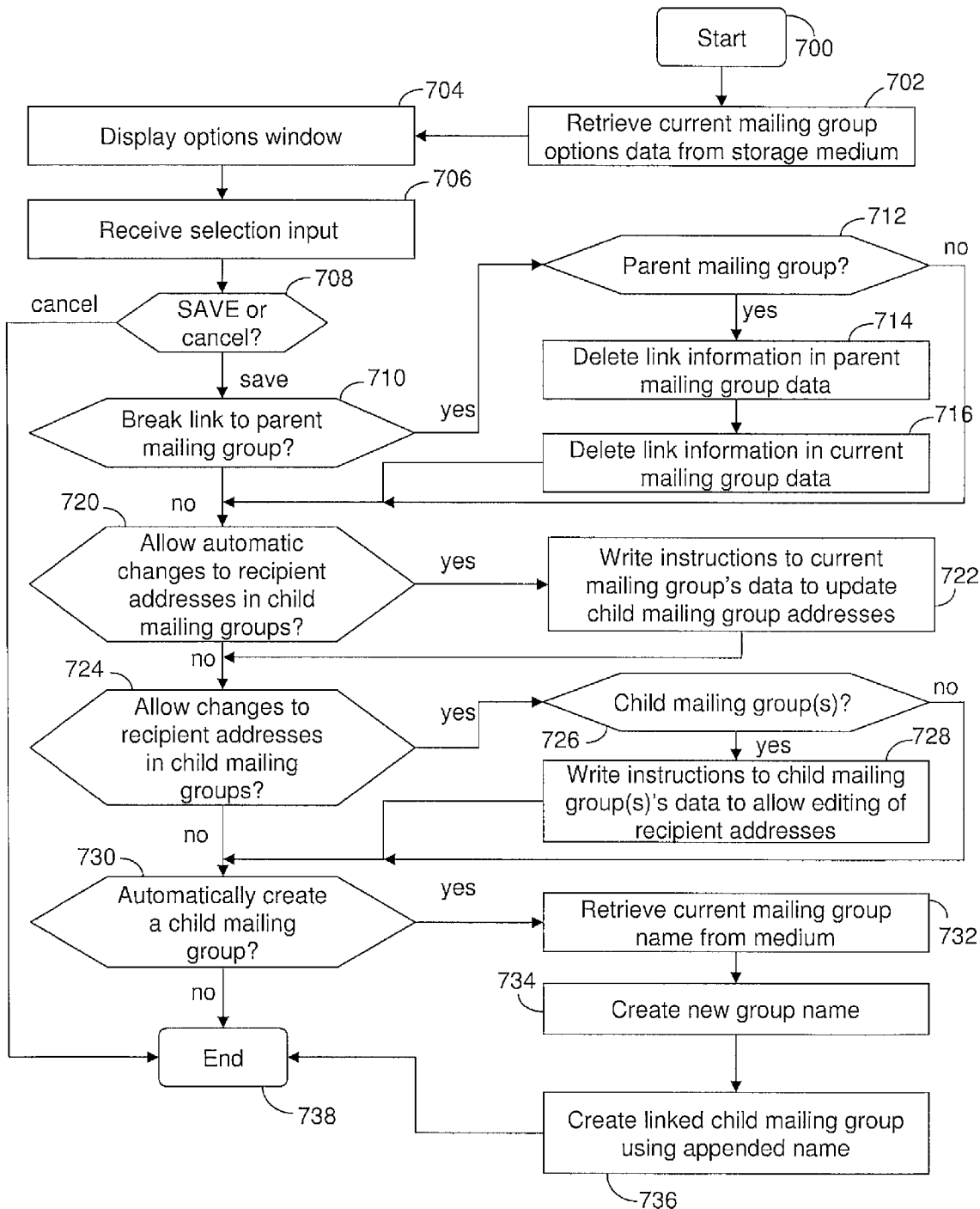
FIG. 12 is a flowchart illustrating a method for associating user selected options to a mailing group in accordance with the embodiments of the present invention.

FIG. 12 is a flowchart illustrating a method by the electronic mail software 80 for associating user selected options to a mailing group name, in accordance with the embodiments of the present invention. In step 702, the software 80 retrieves (from the storage medium 94 and/or 95) the current mailing group options data, where the options data is associated with the current mailing group. In step 706, the software 80 then displays an options window (such as 800 in FIG. 8, where a user may direct the software to perform steps 702 and 704 by selecting the OPTIONS button 214 of FIG. 6 and FIG. 7). In step 706, the software 80 may receive input, such as in the form of selections of the selectable buttons 813 to 816 in window 800 of FIG. 8. In step 708 the software may receive instructions to save or cancel, such as by a user selecting SAVE 810 or CANCEL 811 in the window 800 of FIG. 8.

If the software 80 receives an instruction to save, the program proceeds to step 710, where the software 80 may determine if the user selected "Break link to parent mailing group" (such as by selecting button 813 of FIG. 8), based on the input received in step 706. If this selection has been made, the software proceeds to step 712 and determines if there exists a parent mailing group linked to the current mailing group. If there is a parent mailing group, the software 80 proceeds to step 714 and may delete or otherwise remove any link information (stored in the storage medium 94 and/or 95) in the parent group's data relating to the current mailing group, to break the link between the current mailing group and its parent. The software 80 then proceeds to step 716. If no parent mailing group is found, the software proceeds to step 720. In step 716, the software 80 may delete link information in the current mailing group's data (stored in the storage medium 94 and/or 95) relating to the parent mailing group, and then proceeds to step 720.

In step 720, the software 80 may determine if the user selected "Allow automatic updates to recipient addresses in child mailing groups" (such as by selecting button 814 in FIG. 8), based on the input received in step 706. If the selection has been made, the software 80 proceeds to step 716 and writes instructions to the current mailing group's data to direct the software 80 to automatically update any child mailing groups of the current mailing group with any changes made to the current mailing group's recipient addresses, such as those entered by a user into fields 206 of FIG. 7, for example. The instructions written in step 716 may also be used by the software 80 to automatically update any child mailing groups of the current mailing group created at a later time by a user. After step 722 or if the selection was not made as determined in step 720, the program proceeds to step 724.

In step 724, the software 80 may determine if the user selected "Allow changes to recipient addresses in child mailing groups" (such as by selecting button 815 in FIG. 8), based on the input received in step 706. If the selection has been made, the software 80 proceeds to step 726 and determines if there exists a child mailing group or groups linked the present mailing group. If there exists a child mailing group(s) to the present group, the software proceeds to step 728 and write instructions in the stored data relating to each of the child mailing groups to allow changes to the recipients' addresses in those child groups. After step 728, the software 80 proceeds to step 730. If there exist no child groups, or if the selection has not been made as determined in step 724, the program proceeds to step 730.

In step 730, based on the input received in step 706, the software 80 may determine if the user selected "Automatically create a child mailing group" (such as by selecting button 816 in FIG. 8). If the selection has been made, the software 80 proceeds to step 732, retrieves the current mailing group name from the storage media 94 and/or 95, and proceed to step 734 wherein the software 80 creates a new mailing group name, where the new group name may be an appended name of the current mailing group such as with a number or letter added to the name. For example, where the current mailing group name may be "Smith Team", the automatically generated child group name may be "Smith Team 2". It would be recognized by those skilled in the art that there are a plurality of variations on an existing name that may used as a new child mailing group name. After step 734, the software proceeds to step 736, where the software 80 may create a child mailing group using the newly created name and link the new child group to the current mailing group. After step 736, if the selection has not been made as determined in step 730, or if the software 80 receives an instruction to cancel in step 708, the process ends (738).

Figure 13:
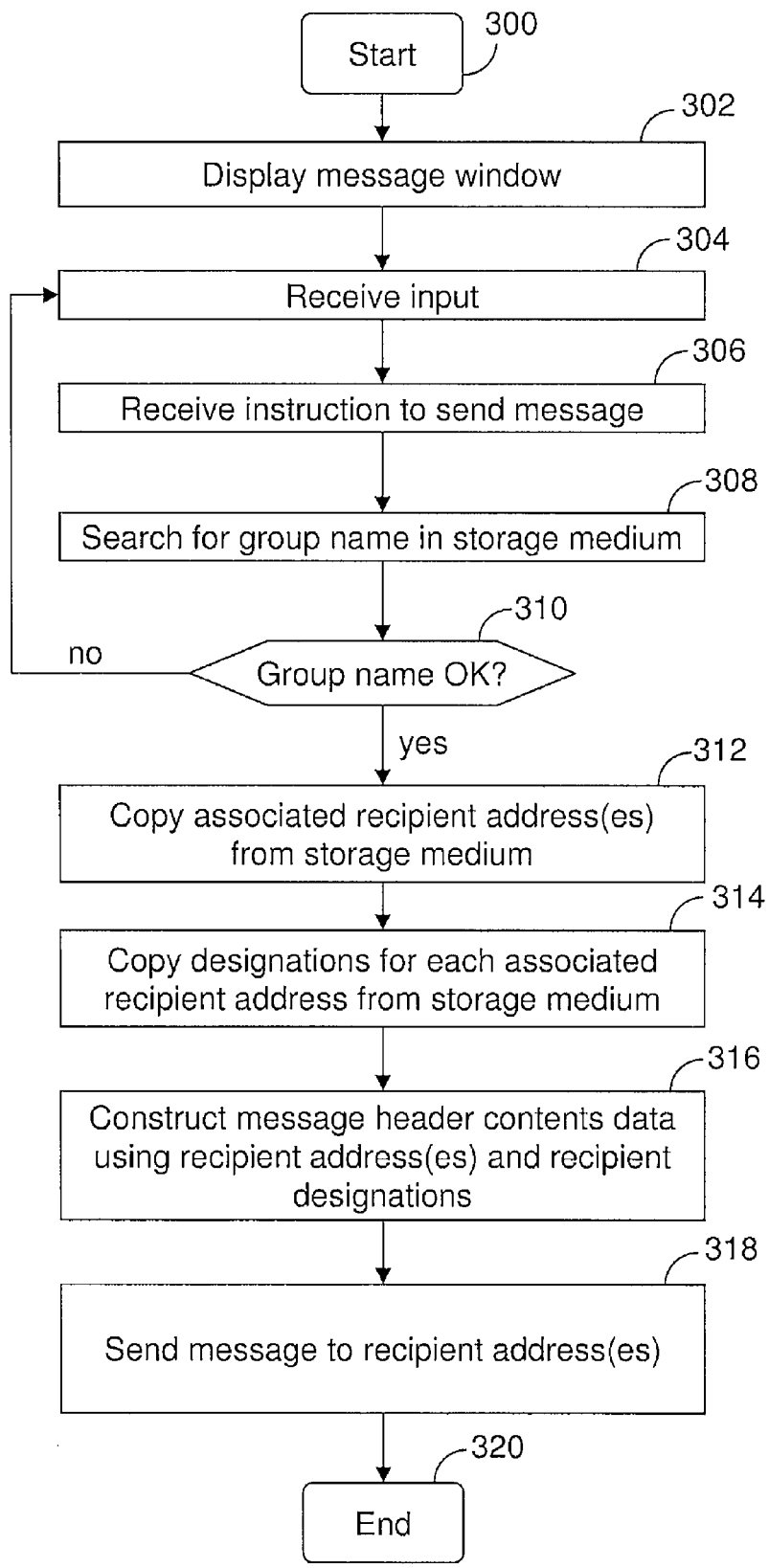
FIG. 13 is a flowchart illustrating a method by the electronic mail software 80 for sending an electronic mail message to recipient addresses represented by a mailing group name, in accordance with the embodiments of the present invention.

FIG. 13 is a flowchart illustrating a method by the electronic mail software 80 for sending an electronic mail message to recipient addresses represented by a mailing group name, in accordance with the embodiments of the present invention. In step 302, the software 80 may display a window or screen for composing an outgoing electronic mail message, such as window 850 of FIG. 9. In step 304, the software may then receive input into storage medium 94 and/or 95, where the input may comprise a mailing group name (such as when a user inputs at least one mailing group name into the To field 858, Carbon Copy field 860, Blind Carbon copy field 862 of FIG. 9). The input comprising the mailing group name may be received from a user through an input device (such as input device 92 of FIG. 2), from another software application, or a combination of these. After step 304 the software may proceed to step 306, where it may receive into a storage medium (such as 94 and/or 95 of FIG. 2) at least one instruction to send the message, where the instruction may be received from a user via an input device (such as 92 of FIG. 2), another software program, or a combination of these.

In response to the instruction received in step 306, the software proceeds to step 308, wherein the software 80 may automatically search for the received mailing group name in a storage medium (such as 94 and/or 95 of FIG. 2), and proceed to step 310. In step 310 the software may automatically determine if the mailing group name is acceptable. If the name is not acceptable, the software returns to step 304. For example, if the name does not exist within the storage medium 94 and/or 95, the software may wait for the input of a correct name with or without a prompt to a user to indicate the error.

If the input name is acceptable, the software 80 proceeds to step 312 and automatically copy the recipient addresses associated with the mailing group name from the storage medium 94 and/or 95, and proceed to step 314. In step 314 the software automatically copies the designation information associated with the group name for each associated recipient address from the storage medium 94 and/or 95, and proceeds to step 316. In step 316, the software 80 may automatically populate the destination fields of the message (such as fields 858, 860, and 862 of FIG. 9) according to the designation information for each recipient address. For example, recipient addresses associated with a Carbon Copy designation may be placed in a Carbon Copy or CC field in an message composition window such as field 860 of window 850 in FIG. 9. The program may then proceed to step 316.

In step 316 software automatically constructs the message header contents data (see 402 of FIG. 4A) using the recipient addresses and designation information, as well as remaining message content such as that shown in FIG. 4A and FIG. 4B, and then proceed to step 318. In step 318, the software automatically sends or otherwise transmits the message to the recipient address or addresses according to the designation information for each recipient address associated with the group name, wherein each recipient designated as a To recipient is disclosed to all recipients of the message, each recipient designated as a Carbon Copy recipient is disclosed to all recipients of the message, and each recipient designated as a Blind Carbon Copy recipient is not disclosed to any other recipients of the message.

The present invention may be implemented in any e-mail software program, such as OUTLOOK, LOTUS NOTES, THUNDERBIRD, HOTMAIL, GMAIL, YAHOO! MAIL, and the like. Those skilled in the art may recognize that while different e-mail software programs may have different terminology (e.g. address book vs. contacts) and have different arrangements of features (such as where mailing group names as stored) the present invention may be configured for any e-mail software program.

Figure 14:
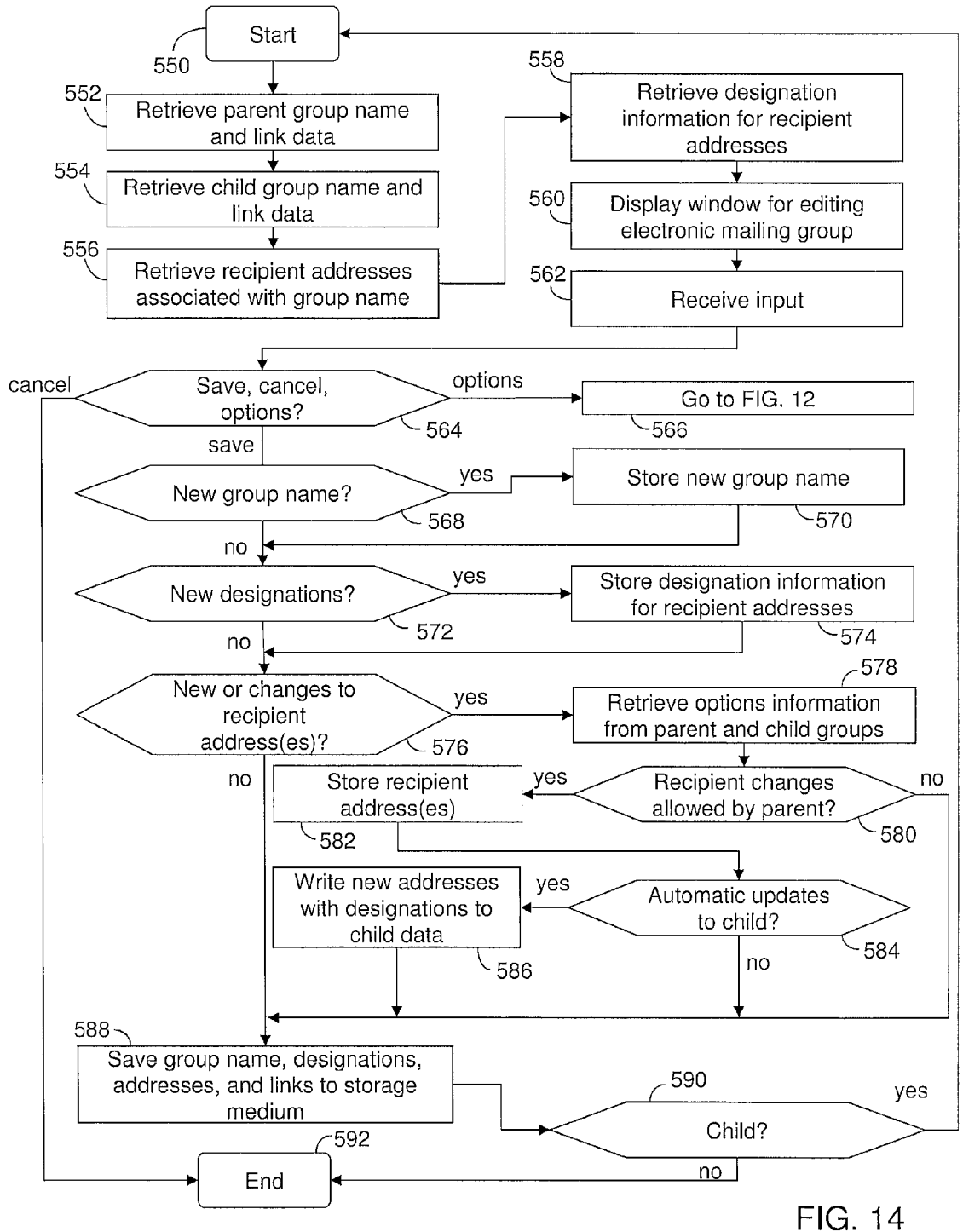
FIG. 14 is a flowchart illustrating a method by the electronic mail software 80 for editing an existing mailing group, in accordance with the embodiments of the present invention.

FIG. 14 is a flowchart illustrating a method by the electronic mail software 80 for editing an existing mailing group, in accordance with the embodiments of the present invention, such as when a user directs the software 80 to display a window (such as window 200 in FIG. 6) for editing an existing mailing group. In step 552, the software 80 may retrieve from storage media (such as 94 and/or 95) any existing parent mailing group name and link data associated with the parent mailing group name, and proceed to step 554. In step 554, the software 80 may retrieve from the storage media any existing child(ren) mailing group name(s) and link data associated with the child(ren) mailing group name(s), and proceed to step 556.

In step 556 the software retrieves the recipient addresses associated with the current mailing group name, proceeds to step 558 where the software retrieves the designation information associated with the recipient addresses retrieved in step 556 and the parent mailing group name retrieved in step 552, and then proceeds to step 560.

In step 560, the software may display a window or screen for editing the current mailing group, such as the window 200 in FIG. 6 for example.

After displaying the window in step 560, the software 80 proceeds to step 562 where the software 80 may receive input, where the input may comprise information for designation selections (such as in the designation fields 209 or FIG. 7), changes to recipient addresses (such as in fields 207 of FIG. 7), new recipient addresses (such as may be entered in field 206 in FIG. 7), a new group name (such as in field 201 of FIG. 7), or a combination of these, and then proceed to step 564.

In step 564, the software may receive directions, where the directions may direct the software to save, cancel or edit mailing group options (such when a user may select save 210, options 214, or cancel 211 buttons of FIG. 7). If the software 80 receives directions to edit options, the software proceeds to step 566 and follows the algorithm illustrated in the flow chart of FIG. 12. If the software receives directions to cancel, the software may end the program (592).

If the software 80 receives directions to save, the software 80 proceeds to step 568 and determines if the input in step 562 comprises a new group name (entered in field 201 of FIG. 7, for example) for the group being edited. If the input comprises a new group name, the software 80 proceeds to step 570 and stores the new group name in the storage medium (such as 94 and/or 95 of FIG. 2) and proceeds to step 572. If, in step 568, the software determines that the input does not comprise a new group name, the software 80 proceeds directly to step 572.

In step 572, the software determines if the input in step 562 comprises new designation information (such as entered in fields 209 of FIG. 7, for example), for association with the recipient addresses retrieved in step 566 and the mailing group name retrieved in step 552. If the input does comprise new designation information, the software 80 proceeds to step 574, stores the new designation information to the storage media, and proceeds to step 576. If, in step 572, the software determines the input does not comprise new designation information, the software proceeds directly to step 576.

In step 576, the software 80 may determine if the input in step 562 comprises any new recipient addresses (such as may be entered into empty recipient address field 206 in FIG. 7), or changes to addresses retrieved in step 556. If the input does comprise new addresses or changes to addresses, the software 80 proceeds to step 578 and retrieves the options information associated with any parent and/or child group names retrieved in steps 552 and 554, respectively, and proceed to step 580.

In step 580, the software 80 determines if recipient address changes are permitted by the parent group, and proceeds to step 582. In step 582, if the changes are allowed based on the options information retrieved in step 578, or if no parent mailing group name was retrieved in step 552, the software 80 stores the recipient address changes in the storage media, and proceeds to step 584. If changes are not allowed as determined in step 580, the software proceeds directly to step 588 without storing the changes.

In step 584, the software 80 determines if automatic updates are required for child mailing group names retrieved in step 554 of the current group being edited based on the options information retrieved in step 578. If updates are required, the software 80 proceeds to step 586 and writes the new addresses and/or address changes with associated designations to the child group name data in the storage media, and then proceeds to step 588. If no changes are allowed or if no child mailing group name was retrieved in step 554, the software 80 proceeds directly to step 588 and does not write any of the changes to the child mailing group name data.

In step 588, the software saves the current mailing group to storage media (such as 94 and/or 95 of FIG. 2) by saving all the input information to the storage media, which may comprise a new group name, new and/or changes to recipient addresses, new and/or changes to designations for recipient addresses, and link information to any parent or child mailing groups.

The software may then proceed to step 590, wherein the software may present the user with a clickable link (such as the CHILD button 212 in FIG. 7), where the user may create a child mailing group of the group saved in step 588. If a user selects yes, the software 80 may loop back to start (550), or if a user selects no the program ends (592).

The foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed:

1. A method for creating an electronic mailing group, said method comprising:
    associating a first group name of a first electronic mailing group with a plurality of electronic mail addresses such that the first electronic mailing group comprises said addresses;
    after said associating the first group name, designating each address in the first electronic mailing group as a first recipient type selected from the group consisting of a To recipient, a Carbon Copy recipient, and a Blind Carbon Copy recipient, wherein said designating each address in the first electronic mailing group is performed independently for each address in the first electronic mailing group and results in one or more addresses in the first electronic mailing group being designated as said To recipient and at least one address in the first electronic mailing group being designated as said Carbon Copy recipient or said Blind Carbon Copy recipient;
    after said designating is performed for all addresses in the first electronic mailing group, a processor of a computer system storing in a computer readable storage medium first information pertaining to the first electronic mailing group, wherein the computer readable storage medium is a storage device of the computer system, wherein the first information comprises the first group name, the addresses in the first electronic mailing group, and the designated first recipient type of each address in the first electronic mailing group, and wherein the first information stored in the computer readable storage medium is configured to be subsequently retrieved from the computer readable storage medium for specifying the addresses in the first electronic mailing group as first recipients of a first electronic mail message to be sent to said first recipients in accordance with the designated first recipient type of each address in the first electronic mailing group; and
    creating a child electronic mailing group of the first electronic mailing group to generate a link between the child electronic mailing group and the first electronic mailing group, wherein the child electronic mailing group comprises addresses which are identical to the addresses in the first electronic mailing group, and wherein a common address of said addresses has a first recipient type in the first electronic mailing group and a different recipient type in the child electronic mailing group.

2. The method of claim 1, said method further comprising:
    associating a second group name of a second electronic mailing group with said addresses in the first electronic mailing group such that the second electronic mailing group comprises said addresses, resulting in the second electronic mailing group being a child group of the first electronic mailing group such that the addresses in the second electronic mailing group are identical to the addresses in the first electronic mailing group;
    after said associating the second group name, designating each address in the second electronic mailing group as a second recipient type selected from the group consisting of said To recipient, said Carbon Copy recipient, and said Blind Carbon Copy recipient, wherein said designating each address in the second electronic mailing group is performed independently for each address in the second electronic mailing group and results in one or more addresses in the second electronic mailing group being designated as said To recipient and at least one address in the second electronic mailing group being designated as said Carbon Copy recipient or said Blind Carbon Copy recipient, and wherein the first recipient type and the second recipient type of at least one address of said plurality of addresses differ from each other;
    after said designating is performed for all addresses in the second electronic mailing group, said processor storing in the computer readable storage medium second information pertaining to the second electronic mailing group, wherein the second information comprises the second group name, the addresses in the second electronic mailing group, and the designated second recipient type of each address in the second electronic mailing group, and wherein the second information stored in the computer readable storage medium is configured to be subsequently retrieved from the computer readable storage medium for specifying the addresses in the second electronic mailing group as second recipients of a second electronic mail message to be sent to said second recipients in accordance with the designated second recipient type of each address in the second electronic mailing group.

3. The method of claim 1, wherein the first recipient type of a first address in the first electronic mailing group and the first recipient type of a second address in the first electronic mailing group differ from each other.

4. The method of claim 1, wherein the method further comprises:
    changing the addresses in the first electronic mailing group to generate a revised set of addresses in the first electronic mailing group; and
    responsive to said changing the addresses in the first electronic mailing group and to the link between the child electronic mailing group and the first electronic mailing group, changing the addresses in the child electronic mailing group in a manner that results in the addresses in the child electronic mailing group being identical to the revised set of addresses in the first electronic mailing group.

5. The method of claim 4, wherein the method further comprises:

after said changing the addresses in the child electronic mailing group, breaking the link between the child electronic mailing group and the first electronic mailing group; and after said breaking the link, updating the addresses in the first electronic mailing group, wherein the addresses in the child electronic mailing group are not updated in response to said updating the addresses in the first electronic mailing group due to said breaking the link having been performed.

6. A computer program product, comprising a physically tangible computer readable storage unit, said storage unit being a storage device storing a computer readable program code that when executed on a processing unit implements the method of claim 1, wherein the processing unit consists of the processor of the computer system.

7. A process for deploying computing infrastructure, said process comprising integrating computer readable code into a computer system, wherein the code in combination with the computer system is capable of performing a method, said method comprising:

associating a first group name of a first electronic mailing group with a plurality of electronic mail addresses such that the first electronic mailing group comprises said addresses;

after said associating the first group name, designating each address in the first electronic mailing group as a first recipient type selected from the group consisting of a To recipient, a Carbon Copy recipient, and a Blind Carbon Copy recipient, wherein said designating each address in the first electronic mailing group is performed independently for each address in the first electronic mailing group and results in one or more addresses in the first electronic mailing group being designated as said To recipient and at least one address in the first electronic mailing group being designated as said Carbon Copy recipient or said Blind Carbon Copy recipient;

after said designating is performed for all addresses in the first electronic mailing group, a processor of the computer system storing in a computer readable storage medium first information pertaining to the first electronic mailing group, wherein the computer readable storage medium is a storage device of the computer system, wherein the first information comprises the first group name, the addresses in the first electronic mailing group, and the designated first recipient type of each address in the first electronic mailing group, and wherein the first information stored in the computer readable storage medium is configured to be subsequently retrieved from the computer readable storage medium for specifying the addresses in the first electronic mailing group as first recipients of a first electronic mail message to be sent to said first recipients in accordance with the designated first recipient type of each address in the first electronic mailing group; and creating a child electronic mailing group of the first electronic mailing group to generate a link between the child electronic mailing group and the first electronic mailing group, wherein the child electronic mailing group comprises addresses which are identical to the addresses in the first electronic mailing group, and wherein a common address of said addresses has a first recipient type in the first electronic mailing group and a different recipient type in the child electronic mailing group.

8. The method of claim 7, said method further comprising associating a second group name of a second electronic mailing group with said addresses in the first electronic mailing group such that the second electronic mailing group comprises said addresses, resulting in the second electronic mailing group being a child group of the first electronic mailing group such that the addresses in the second electronic mailing group are identical to the addresses in the first electronic mailing group;

after said associating the second group name, designating each address in the second electronic mailing group as a second recipient type selected from the group consisting of said To recipient, said Carbon Copy recipient, and said Blind Carbon Copy recipient, wherein said designating each address in the second electronic mailing group is performed independently for each address in the second electronic mailing group and results in one or more addresses in the second electronic mailing group being designated as said To recipient and at least one address in the second electronic mailing group being designated as said Carbon Copy recipient or said Blind Carbon Copy recipient, and wherein the first recipient type and the second recipient type of at least one address of said plurality of addresses differ from each other;

after said designating is performed for all addresses in the second electronic mailing group, said processor storing in the computer readable storage medium second information pertaining to the second electronic mailing group, wherein the second information comprises the second group name, the addresses in the second electronic mailing group, and the designated second recipient type of each address in the second electronic mailing group, and wherein the second information stored in the computer readable storage medium is configured to be subsequently retrieved from the computer readable storage medium for specifying the addresses in the second electronic mailing group as second recipients of a second electronic mail message to be sent to said second recipients in accordance with the designated second recipient type of each address in the second electronic mailing group.

9. The process of claim 7, wherein the first recipient type of a first address in the first electronic mailing group and the first recipient type of a second address in the first electronic mailing group differ from each other.

10. The process of claim 7, wherein the method further comprises:

changing the addresses in the first electronic mailing group to generate a revised set of addresses in the first electronic mailing group; and responsive to said changing the addresses in the first electronic mailing group and to the link between the child electronic mailing group and the first electronic mailing group, changing the addresses in the child electronic mailing group in a manner that results in the addresses in the child electronic mailing group being identical to the revised set of addresses in the first electronic mailing group.

11. The process of claim 10, wherein the method further comprises:

after said changing the addresses in the child electronic mailing group, breaking the link between the child electronic mailing group and the first electronic mailing group; and after said breaking the link, updating the addresses in the first electronic mailing group, wherein the addresses in the child electronic mailing group are not updated in response to said updating the addresses in the first electronic mailing group due to said breaking the link having been performed.

12. A method for sending an electronic mail message, said method being implemented via execution of computer readable program code on a processor of a computer system, said method comprising:

receiving a group name of a first electronic mailing group into a computer-readable storage medium, wherein the computer readable storage medium is a storage device of the computer system, said group name representing a plurality of recipient electronic mail addresses associated with said group name and comprised by the first electronic mailing group, wherein each address of said addresses has a designation as a To recipient, a Carbon Copy recipient or a Blind Carbon Copy recipient, wherein at least one address of said addresses has a designation as a Carbon Copy recipient or a Blind Carbon Copy recipient;

receiving at least one instruction, into said computer readable storage medium, to send said message to said group name; and responsive to said receiving said at least one instruction, sending automatically said message to each address of said addresses, wherein said message is sent according to said designation for each address of said addresses, wherein each said To recipient is disclosed to all recipients of said message, wherein each said Carbon Copy recipient is disclosed to all recipients of said message, wherein each said Blind Carbon Copy recipient is not disclosed to any other recipients of said message; and creating a child electronic mailing group of the first electronic mailing group to generate a link between the child electronic mailing group and the first electronic mailing group, wherein the child electronic mailing group comprises addresses which are identical to the addresses in the first electronic mailing group, and wherein a common address of said addresses has a first recipient type in the first electronic mailing group and a different recipient type in the child electronic mailing group.

13. A computer program product, comprising a physically tangible computer readable storage unit, said storage unit being a storage device storing a computer readable program code that when executed on a processing unit implements the method of claim 12, wherein the processing unit consists of the processor of the computer system.

14. The method of claim 12, wherein the designation of a first address of said addresses in said first electronic mailing group differs from the designation of a second address of said addresses in said first electronic mailing group.

15. A method for creating an electronic mailing group, said method being implemented via execution of computer readable program code on a processor of a computer system, said method comprising:

storing a first input in a computer readable storage medium, wherein the computer readable storage medium is a storage device of the computer system, wherein said first input comprises a first group name for distributing a first electronic mail message;

associating said first group name with a plurality of electronic mail addresses, based on a first set of received instructions, wherein said first group name represents a first electronic mailing group comprising said addresses; and after said associating, storing information associated with said first group name in said computer readable storage medium, wherein said information is associated with each address of said addresses and designates each address of said addresses as a first recipient type selected from the group consisting of To recipient, Carbon Copy recipient, and Blind Carbon Copy recipient, wherein at least one address of said addresses is designated as a Carbon Copy recipient or a Blind Carbon Copy recipient;

after said storing said information, storing a second input in said computer readable storage medium, wherein said second input comprises a second group name for distributing a second electronic mail message;

associating said second name with said plurality of electronic mail addresses, based on a second set of received instructions, wherein said second group name represents said addresses;

after said associating said second name, storing information associated with said second group name in said computer readable storage medium, wherein said information associated with said second group name is associated with each address of said addresses and designates each address of said addresses as a second recipient type selected from the group consisting of To recipient, Carbon Copy recipient, and Blind Carbon Copy recipient, wherein at least one address of said addresses is designated as a Carbon Copy recipient or a Blind Carbon Copy recipient, wherein, for at least one address of said addresses, said second recipient type designated by said information associated with said second group name is different from said first recipient type designated by said information associated with said first group name; and creating a child electronic mailing group of the first electronic mailing group to generate a link between the child electronic mailing group and the first electronic mailing group, wherein the child electronic mailing group comprises addresses which are identical to the addresses in the first electronic mailing group, and wherein a common address of said addresses has a first recipient type in the first electronic mailing group and a different recipient type in the child electronic mailing group.

\* \* \* \* \*